United States Patent
Murakami et al.

(10) Patent No.: US 6,795,295 B2
(45) Date of Patent: Sep. 21, 2004

(54) MULTI-LAYER CAPACITOR AND METHOD FOR PRODUCING THE SAME

(75) Inventors: Kenji Murakami, Gifu (JP); Motohiko Sato, Aichi (JP); Jun Otsuka, Aichi (JP); Manabu Sato, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 10/680,409

(22) Filed: Oct. 8, 2003

(65) Prior Publication Data

US 2004/0125539 A1 Jul. 1, 2004

(30) Foreign Application Priority Data

Oct. 8, 2002 (JP) ........................................ 2002-294351
Aug. 6, 2003 (JP) ........................................ 2003-287822

(51) Int. Cl.[7] .............................................. H01G 4/228
(52) U.S. Cl. ................................ 361/306.3; 361/306.1; 361/321.1; 361/321.5; 361/311; 361/313
(58) Field of Search ........................... 361/306.3, 306.1, 361/321.1, 321.3, 321.4, 321.5, 311, 313, 301.4, 307, 309, 320, 328, 330

(56) References Cited

U.S. PATENT DOCUMENTS

| | | | |
|---|---|---|---|
| 6,034,864 A | | 3/2000 | Naito et al. |
| 6,134,098 A | * | 10/2000 | Kuroda et al. ........... 361/321.2 |
| 6,254,715 B1 | * | 7/2001 | Okazaki et al. ............ 156/280 |
| 6,362,947 B1 | * | 3/2002 | Chazono .................. 361/306.3 |
| 6,370,011 B1 | | 4/2002 | Naito et al. |
| 6,407,907 B1 | * | 6/2002 | Ahiko et al. ............. 361/306.3 |
| 6,462,932 B1 | | 10/2002 | Naito et al. |
| 6,496,354 B2 | | 12/2002 | Naito et al. |
| 6,549,395 B1 | | 4/2003 | Naito et al. |
| 6,724,611 B1 | * | 4/2004 | Mosley .................... 361/306.3 |
| 2002/0109958 A1 | | 8/2002 | Naito et al. |

FOREIGN PATENT DOCUMENTS

| | | |
|---|---|---|
| JP | 5-347227 | 12/1993 |
| JP | 7-193375 | 7/1995 |
| JP | 11-204372 | 7/1999 |

\* cited by examiner

*Primary Examiner*—Anthony Dinkins
*Assistant Examiner*—Nguyen T. Ha
(74) *Attorney, Agent, or Firm*—Sughrue Mion, PLLC

(57) ABSTRACT

A multi-layer capacitor including a capacitor body including dielectric layers, and first and second internal electrode layers which are alternately laminated by mediation of the dielectric layers. The laminate of the first and second internal electrode layers and the dielectric layers are co-fired. The capacitor body further includes first and second electrode terminals formed on one main surface of the capacitor body. At least a single first via electrode extends through the capacitor body in the lamination direction of the capacitor body so as to connect the first electrode terminal and the first internal electrode layers, and at least a single second via electrode extends through the capacitor body in the lamination direction of the capacitor body so as to connect the second electrode terminal and the second internal electrode layers. The via electrodes have an aspect ratio of 4 to 30 as measured after firing.

14 Claims, 16 Drawing Sheets

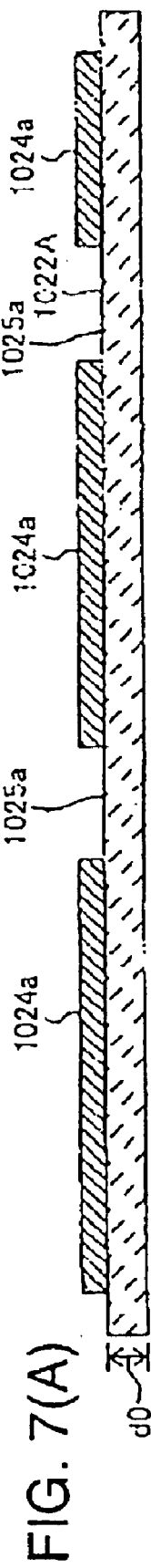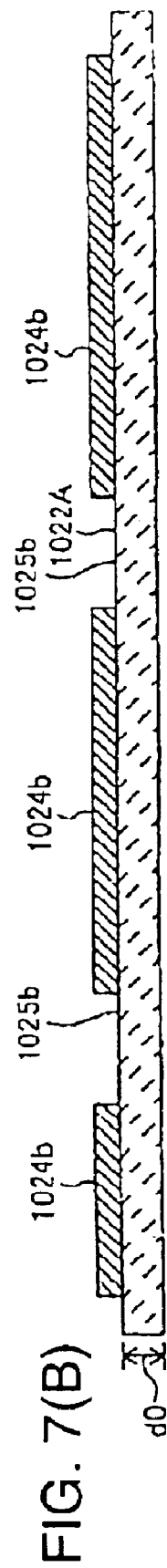

MULTI-LAYER CAPACITOR AND METHOD FOR PRODUCING THE SAME

BACKGROUND OF THE INVENTION

1. Field of the Invention

The present invention relates to a multi-layer capacitor.

2. Description of the Related Art

Recent implementation of high-speed ICs in the field of information and communications technology, typified by digital circuits used in computers and radio transmission, is striking. However, such attainment of high speed and high degree of integration for ICs involves an increase in high-frequency noise, which causes equipment malfunction, and thus raises a serious problem. The high-frequency noise is caused by a drop in supply voltage resulting from simultaneous switching of logic devices. In order to reduce the high-frequency noise, a capacitor for supplying energy to a power supply, or a so-called decoupling capacitor, has been used.

In order to achieve instantaneous supply of large energy, the decoupling capacitor is required to have a large capacitance and a low inductance (ESL). These characteristics mainly depend on the internal structure of a capacitor, and various internal structures have been proposed.

In the case of handling high-frequency waves and high-speed pulses, a conductor line that connects an electronic component mounted on a wiring board to a power supply for supplying operating power to the electronic component imparts excess inductance. An increase in an inductance component of a conductor line increases the difficulty of attaining stable supply of operating voltage. Furthermore, superposition of noise on a conductor line causes malfunction of an electronic component. The above-mentioned implementation of high frequency and a high degree of circuit integration increases occurrence of such a problem. In order to shorten the length of a conductor line extending between a capacitor and a power supply for the purpose of reducing an excess inductance component, a capacitor is proposed in which electrode terminals are formed on only one main surface of a capacitor body.

Existing multi-layer capacitors of the above-mentioned type include a multi-layer capacitor as described below (refer to, for example, Japanese Patent Application Laid-Open (Kokai) No. 5-347227). The multi-layer capacitor includes a capacitor body formed by the steps of alternately laminating dielectric layers and internal electrode layers, and firing the resultant laminate. The multi-layer capacitor is characterized as follows: each of the internal electrode layers includes a first internal electrode layer and a second internal electrode layer that face each other by mediation of a dielectric layer; a first electrode terminal and a second electrode terminal are formed on one main surface of the capacitor body; a first via electrode is formed in the capacitor body so as to extend in the lamination direction of the capacitor body and to connect the first electrode terminal and the first internal electrode layers; and a second via electrode is formed in the capacitor body so as to extend in the lamination direction of the capacitor body and to connect the second electrode terminal and the second internal electrode layers. The facing first and second internal electrode layers function as a capacitor unit, which is the minimum unit that forms a capacitance. The capacitor units are connected in parallel by the first and second via electrodes.

Another known mode of the above-described multi-layer capacitor includes a plurality of first and second via electrodes and a plurality of first and second electrode terminals corresponding to the via electrodes, the plurality of first and second via electrodes being arrayed in a grid.

Recent implementation of ICs (integrated circuits) of high speed and high degree of integration requires a further reduction in the ESL (equivalent series resistance) of a capacitor and reduction in size with high electrical and mechanical reliability without involving a reduction in the capacitance thereof.

SUMMARY OF THE INVENTION

The present invention has been achieved to solve the aforementioned problems or rather to meet future requirements for multi-layer capacitors, and an object of the present invention is to reduce the ESL of a multi-layer capacitor. Another object of the present invention is to provide a multi-layer capacitor including a ceramic capacitor having high electrical and mechanical reliability.

In a first aspect of the invention, as will be understood by reference to FIG. 13(A) or FIG. 14(A), the above objects of the present invention have been achieved by providing (1) a multi-layer ceramic capacitor (100) comprising:

a plurality of dielectric ceramic layers (120), each having first and second layer planes;

a plurality of first internal electrodes (130*a*) provided on the first layer planes of the dielectric ceramic layers (120) and a plurality of second internal electrodes (130*b*) provided on the second layer planes of the dielectric ceramic layers (120), the dielectric layers (120) being sandwiched by the first and second internal electrodes (130*a*,130*b*); and a plurality of first and second columnar electrodes (140*a*, 140*b*) penetrating the dielectric ceramic layers (120) in a direction normal to the layer planes of the ceramic layers (120), the first columnar electrodes (140*a*) being electrically connected to the first internal electrodes (130*a*) and the second columnar electrodes (140*b*) being electrically connected to the second internal electrodes (130*b*), wherein the first and second columnar electrodes(140*a*, 140*b*) each has a corrugation including smaller diameter portions (1038*a*,1038*b*) and larger diameter portions (1037*a*,1037*b*), wherein the first internal electrodes(130*a*) are electrically connected to the first columnar electrodes (140*a*) at larger diameter portions (1037*a*) of the first columnar electrodes and the second internal electrodes (130*b*) are electrically connected to the second columnar electrodes (140*b*) at smaller diameter portions (1037*b*) of the second columnar electrodes, and wherein circumferential edges (1026*a*,1026*b*) of the dielectric ceramic layers (120) intrude into the first and second columnar electrodes (140*a*,140*b*) at the smaller diameter portions (1038*a*,1038*b*) of the first and second columnar electrodes (140*a*,140*b*).

The present invention also provides the following aspects and preferred embodiments.

(2) The multi-layer ceramic capacitor (100) as described in (1), wherein a plurality of first and second holes (200*a*, 200*b*) penetrating said dielectric ceramic layers (120) are formed by laser and said first and second columnar electrodes (140*a*,140*b*) are embedded respectively in the first and second holes (200).

(3) The multi-layer ceramic capacitor as described in (1), wherein said circumferential edges (1026*a*,1026*b*) are rounded or tapered by laser (shown as rounded or tapered portions 1035*a*,1035*b*). Since the circumferential edges (1026a,1026b) of the dielectric ceramic layers(120) are rounded or tapered, the larger diameter portions(1037a, 1037b) of the columnar electrodes (140a,140b) become flange-like connecting portions (1036a,1036b) advantageously tapering toward the internal electrodes (130a,130b) and electrically connecting to the internal electrodes (130a, 130b).

(4) The multi-layer ceramic capacitor as described in (1), wherein a difference in diameter between the larger diameter portions and the smaller diameter portions is more than a thickness of the dielectric ceramic layer (120), the thickness being defined as the distance between the first and second internal electrodes (130a,130b) sandwiching the dielectric layer (120).

(5) The multi-layer ceramic capacitor as described in (1), wherein said columnar electrodes (140a,140b) have an aspect ratio of more than 4, the aspect ratio defined as a value of the length of a given columnar electrode divided by the smallest diameter of the smaller diameter portions of the columnar electrode.

(6) The multi-layer ceramic capacitor as described in (1), wherein said columnar electrodes (140a,140b) have an aspect ration of 4–30, the aspect ratio defined as a value of the length of a given columnar electrode (140a,140b) divided by the smallest diameter of the smaller diameter portions of the columnar electrodes.

(7) The multi-layer ceramic capacitor as described in (1), wherein an average difference between the diameter of the larger diameter portions and the diameter of the smaller diameter portions in said columnar electrodes (140a,140b) is about 10–40 micrometers. In other words, the average height (d) of the tapering flange-like connecting portions (1036a, 1036b) become about 5–20 micrometers.

(8) The multi-layer ceramic capacitor as described in (1), wherein said columnar electrodes (140a,140b) comprise a composite including two metallic grains differing in grain size, an average grain size of one powder being less than ⅓ of that of the other powder and constituting about 25–70 percent by volume of the material of the columnar electrodes.

(9) The multi-layer ceramic capacitor as described in (1), wherein said dielectric ceramic layers, first and second inner electrodes and first and second columnar electrodes are co-fired to obtain the multi-layer ceramic capacitor.

(10) The multi-layer ceramic capacitor as described in (1), wherein the diameter of the first and second columnar electrodes is about 50–120 micrometers as measured at the smallest diameter thereof.

(11) The multi-layer ceramic capacitor as described in (1), further comprising a plurality of first and second external terminals (151a/150a, 151b/150b) connected respectively to the first and second columnar electrodes (140a,140b) and formed on one external surface (170) of the multi-layer ceramic capacitor but not formed on the other external surface of the multi-layer ceramic capacitor. In the first and second external terminals, 151a,151b are solder bumps and 150a,150b are terminal pads.

(12) A multi-layer capacitor comprising a capacitor body comprising a co-fired laminate of dielectric layers and first and second internal electrode layers which are alternately laminated by mediation of the dielectric layers, the capacitor body further comprising first and second electrode terminals formed on one main surface of the capacitor body, at least a single first via electrode extending through the capacitor body in the lamination direction of the capacitor body so as to connect the first electrode terminal and the first internal electrode layers, and at least a single second via electrode extending through the capacitor body in the lamination direction of the capacitor body so as to connect the second electrode terminal and the second internal electrode layers, the via electrodes having an aspect ratio of 4 to 30.

(13) The multi-layer capacitor as described in (12), wherein the via electrodes have a diameter of 50 $\mu$m to 120 $\mu$m.

(14) A method for producing a multi-layer capacitor, comprising:

(a) alternately laminating first and second internal electrode layers by mediation of dielectric layers so as to obtain a capacitor body;

(b) forming a first via electrode extending inward from one main surface of the capacitor body so as to be connected to the first internal electrode layers, and a second via electrode extending inward from one main surface of the capacitor body so as to be connected to the second internal electrode layers; and (c) firing the capacitor body in which the via electrodes are formed;

wherein the via electrodes in the fired capacitor body have an aspect ratio of 4 to 30.

(15) The method for producing a multi-layer capacitor as described in (14), wherein the via electrodes in the fired capacitor body have a diameter of 50 $\mu$m to 120 $\mu$m.

(16) The method for producing a multi-layer capacitor as described in (14), further comprising:

(b1) repeating steps (a) and (b) so as to prepare two or more capacitor bodies having first and second via electrodes formed therein; and (b2) bonding two or more of the capacitor bodies in which the via electrodes are formed, such that the first via electrodes of the respective capacitor bodies are connected to one another, and the second via electrodes of the respective capacitor bodies are connected to one another, wherein, in step (c), the resultant laminate of the capacitor bodies is fired.

An advantage of the multi-layer capacitor (specifically including a ceramic capacitor) according to the invention is attributed to incorporation of a plurality of corrugated columnar electrodes (140a, 140b) for connecting internal electrodes (130a,130b) inside a multi-layer ceramic capacitor. This is because both electrical and mechanical connection by the corrugated columnar electrodes (connecting the internal electrodes that sandwich the dielectric ceramic layers in a multi-layer structure) is assured or rather improved during the firing or co-firing of the green multi-layer ceramic capacitor.

In general, the present invention which at least partially solves the above-mentioned problems provides a multi-layer capacitor comprising a capacitor body comprising dielectric layers; first and second internal electrode layers which are alternately laminated by the mediation of the dielectric layers, a fired laminate of the first and second internal electrode layers and the dielectric layers; first and second external electrode terminals formed on one main surface of the capacitor body; at least a single first via electrode (namely, first columnar electrode) extending through a hole or holes formed by laser beam irradiation inside the capacitor body in a lamination direction of the capacitor body (namely, in the direction normal to a plane of the dielectric layer and internal electrodes formed thereon) so as to connect the first electrode terminal and the first internal electrode layers; and at least a single second via electrode (namely, second columnar electrode) extending through a hole or holes formed by laser beam irradiation inside the capacitor body in the lamination direction of the capacitor body so as to connect the second electrode terminal and the second internal electrode layers; wherein the via electrodes have an aspect ratio of at least 4.

Notably, the aspect ratio of the via electrode is defined by the ratio of the length of the via electrode to the diameter thereof.

Conventionally, a low aspect ratio of less than 4 has been used to minimize the internal inductance, but as a result, the capacitance was sacrificed since the area of the inner electrodes was inevitably reduced. The adoption of the corrugated columnar electrode as a via-electrode for connecting the inner electrodes of the capacitance can advantageously solve this problem, because the internal current flows smoothly to reduce impedance at the connection.

Magnetic fluxes induced by current flowing through the first and second columnar via electrodes can be more effectively cancelled when neighboring first and columnar electrodes are arranged so that the current therethrough flows in opposite directions, whereby ESL is reduced.

In the multi-layer capacitor of the present invention, the aspect ratio of the via electrode can be advantageously increased and is preferably 4 to 25, more preferably 5 to 20.

In the multi-layer capacitor of the present invention, the diameter of the via electrode can be advantageously reduced and is preferably 50 $\mu$m to 120 $\mu$m, more preferably 60 $\mu$m to 110 $\mu$m, most preferably 70 $\mu$m to 100 $\mu$m. Therefore many via electrodes can be incorporated, effectively leading to cancellation of magnetic fluxes. In order to accommodate such a columnar via electrode inside the ceramic capacitor, a through-hole penetrating a green laminate of dielectric layers and inner electrodes is formed advantageously by a pulsed laser, according to an aspect of the invention.

The present inventors have found that a corrugated inner wall of a hole formed in a green laminate of the multi-layer ceramic capacitor is advantageous in forming a columnar via electrode of small diameter having a corrugation and with an aspect ratio of at least 4. This is because laser beam irradiation can be focused to vary the configuration of the corrugation by varying the energy and duration of laser beam, whereby the hole diameter is varied along the vertical direction of hole so as to precisely form larger diameter and smaller diameter portions of the columnar electrode in the hole.

Corrugation of both columnar electrodes and holes improves both mechanical strength and electrical performance in the multi-layer capacitor after firing. This is particularly the case when dimensional difference in diameter between a smaller and larger diameter portion of the corrugated columnar electrode exceeds the thickness of the dielectric ceramic layer, and when the circumferential edges of the dielectric ceramic layer formed at the holes are rounded or tapered by a laser. Specifically, the multi layer capacitor performs superbly when the dimensional difference thereof is about 10–40 micrometers and when the diameter of the first and second columnar electrodes is about 50–120 micrometers as measured at the smallest diameter thereof.

The present invention can be embodied in various forms. For example, the invention can be embodied in the form of a multi-layer capacitor and a method for producing a multi-layer capacitor.

BRIEF DESCRIPTION OF THE DRAWINGS

FIGS. 7(A) and 7(B) are explanatory views of the production process shown in FIG. 6.

FIG. 13(B) shows the embodiment of FIG. 13(A) prior to charging with an electrically conductive material.

FIG. 14(B) shows the embodiment of FIG. 14(A) prior to charging with an electrically conductive material.

DESCRIPTION OF REFERENCE NUMERALS USED IN THE DRAWINGS

Figure 1:
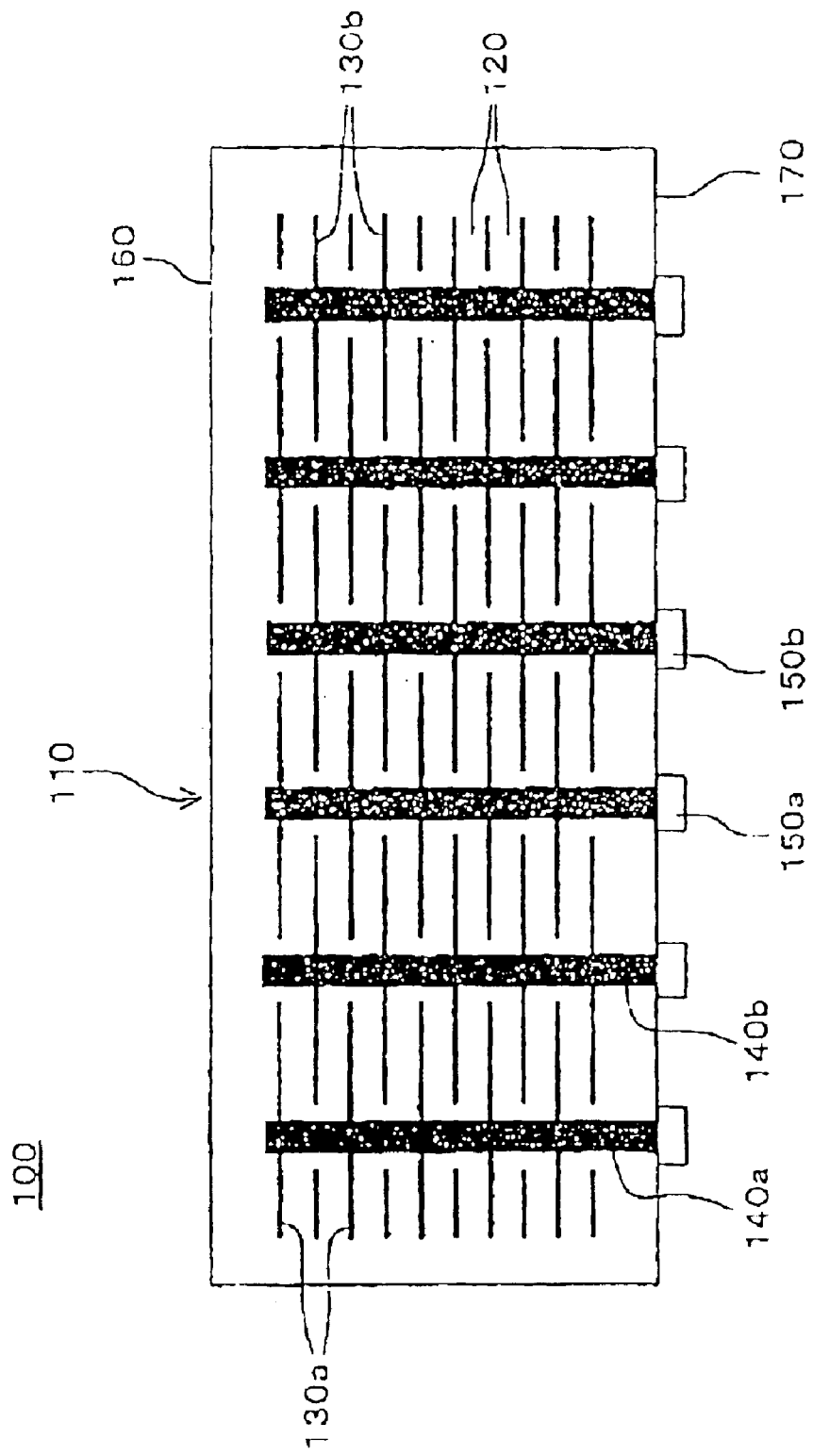
FIG. 1 is a vertical sectional view showing a multi-layer capacitor of the present invention.

100 multi-layer capacitor
110 capacitor body
120 dielectric ceramic layer
130*a* first internal electrode layer
130*b* second internal electrode layer
140*a* first columnar electrode (first via electrode)
140*b* second columnar electrode (second via electrode)
150*a* first electrode terminal pad
150*b* second electrode terminal pad
151*a* first solder bump 151b second solder bump
160 first main surface
170 second main surface
180 gap
190 gap
200a first via hole
200b second via hole
1010 multi-layer ceramic capacitor
1022 ceramic layer
1022A ceramic green sheet
1024 internal electrode layer
1024a first internal electrode layer
1024b second internal electrode layer
1024c end surface of internal electrode layer
1025 (1025a, 1025b) aperture
1025A region in which apertures are vertically aligned
1025B region which surrounds apertures
1026 through-hole
1026a circumferential edge of first dielectric ceramic layer
1026b circumferential edge of second dielectric ceramic layer
1028 via electrode
1028a first via electrode
1028b second via electrode
1030a first terminal
1030b second terminal
1032 cover layer
1033 exfoliation sheet
1034 cover sheet
1035a/1035b rounded or tapered portion of dielectric layer
1036a flange-like connecting portion of first columnar electrode
1036b flange-like connecting portion of second columnar electrode
1037a larger diameter portion of first columnar electrode
1037b larger diameter portion of second columnar electrode
1038a smaller diameter portion of first columnar electrode
1038b smaller diameter portion of second columnar electrode
(d): height of flange-like portion
1050 laser beam
1100 laminated sheet
1110 charging container
1112 casing
1114 bottom plate
1116 actuator
1118 pressing plate

DETAILED DESCRIPTION OF THE PREFERRED EMBODIMENTS

The present invention will next be described with reference to the following embodiments. However, the present invention should not be construed as being limited thereto.

A. First Embodiment:

FIG. 1 is a vertical sectional view of a multi-layer capacitor 100 of the present invention. The multi-layer capacitor 100 includes a ceramic capacitor body 110. The capacitor body 110 includes a plurality of dielectric layers 120 formed of a ceramic material having a high dielectric constant, such as $BaTiO_3$, and a plurality of pairs of first and second internal electrode layers 130a and 130b, the first and second internal electrode layers 130a and 130b being paired so as to face each other by mediation of a corresponding dielectric layer 120, to thereby form a plurality of capacitor units.

The capacitor body 110 includes first and second main surfaces 160 and 170 extending in parallel with the internal electrode layers 130a and 130b. A plurality of first and second external electrode terminals 150a and 150b are formed in a grid array on the second main surface 170 of the capacitor body 110.

First via electrodes 140a in a columnar configuration are provided in the capacitor body 110 such that each of the first via electrodes 140a extends through the dielectric layers 120 for electrically connecting the corresponding first electrode terminal 150a and the first internal electrode layers 130a. Second via electrodes 140b are provided in the capacitor body 110 such that the first and second via electrodes 140a and 140b are arranged adjacent to one another and such that each of the second via electrodes 140b extends through the dielectric layers 120 for electrically connecting the corresponding second electrode terminal 150b and the second internal electrode layers 130b. In the present embodiment, the via electrodes have an aspect ratio of 10 and a diameter of about 100 µm and are formed in a grid array at intervals of about 400 µm.

Connection of the first and second via electrodes to the internal electrode layers will be described in detail with reference to FIG. 2. FIGS. 2(A) and 2(B) are horizontal sectional views of the multi-layer capacitor 100 of the present invention. As is apparent from FIGS. 2(A) and 2(B), FIG. 2(A) shows a cross section including one of the first internal electrode layers 130a, and FIG. 2(B) shows a cross section including one of the second internal electrode layers 130b.

Figure 2A:
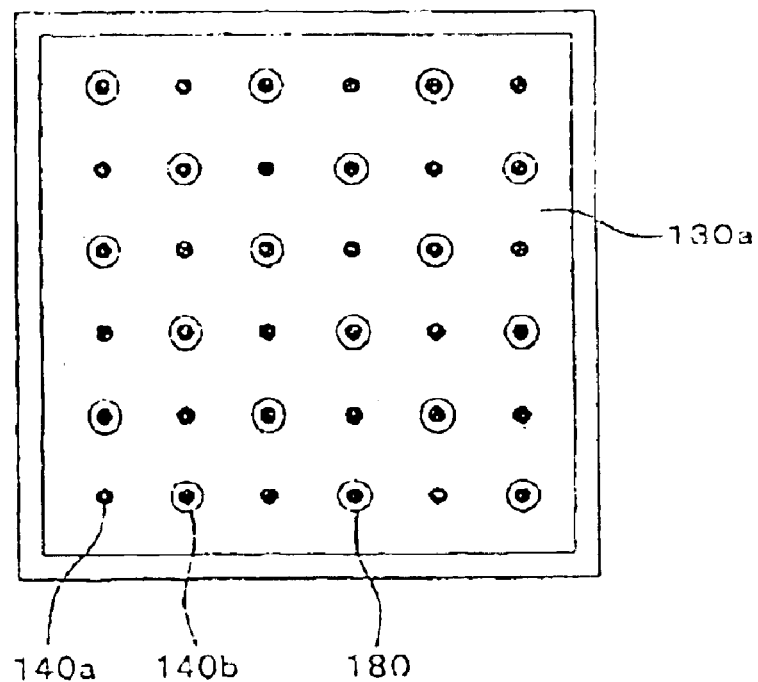
FIGS. 2(A) and 2(B) are horizontal sectional views showing the multi-layer capacitor of the present invention.
Figure 2B:
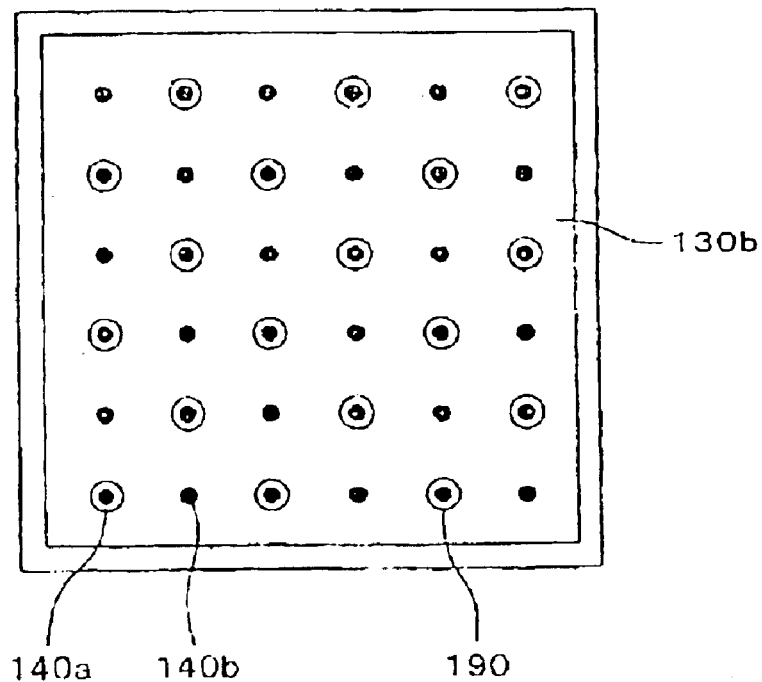

As shown in FIG. 2(A), a gap 180 is formed around each of the second via electrodes 140b at a portion of the first internal electrode layer 130a where the second via electrode 140b penetrates, whereby the second via electrode 140b is electrically insulated from the first internal electrode layer 130a. As shown in FIG. 2(B), a gap 190 is formed around each of the first via electrodes 140a at a portion of the second internal electrode layer 130b where the first via electrode 140a penetrates, whereby the first via electrode 140a is electrically insulated from the second internal electrode layer 130b.

In order to obtain a higher capacitance, the present embodiment is configured such that a plurality of the first internal electrode layers 130a and a plurality of the second internal electrode layers 130b are alternately arranged in the lamination direction of the dielectric layers 120 (i.e. in a direction normal to the layer plane), thereby forming a plurality of capacitor units. The plurality of capacitor units are connected in parallel by way of the first and second via electrodes 140a and 140b. In the present embodiment, five first internal electrode layers 130a and five second internal electrode layers 130b are formed. Preferably, the internal electrode layers are formed in a greater number, such as 50 or more.

A method for producing the capacitor body 110 will next be described with reference to FIG. 3.

Figure 3A:
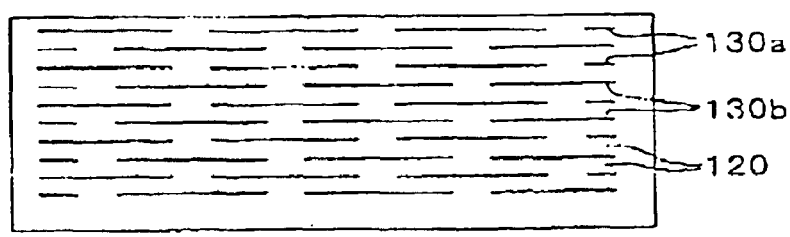
FIG. 3 is an explanatory view showing a method for producing the multi-layer capacitor of the present invention.
Figure 3B:
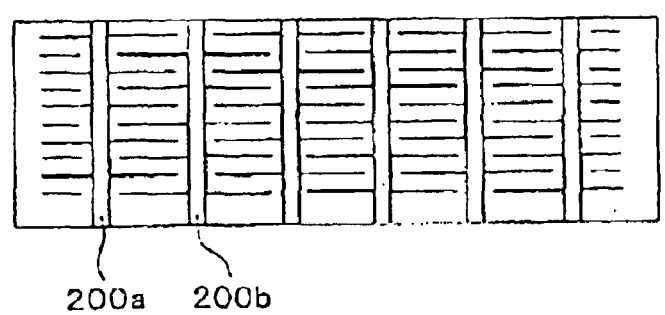
Figure 3C:
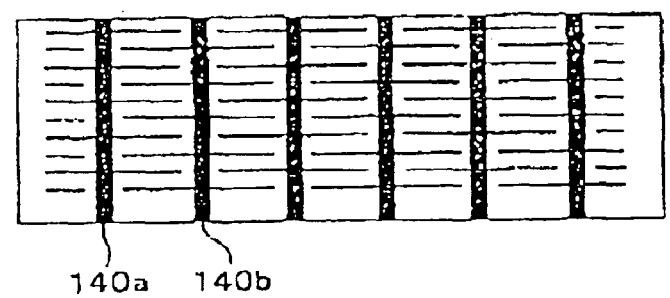
Figure 3D:
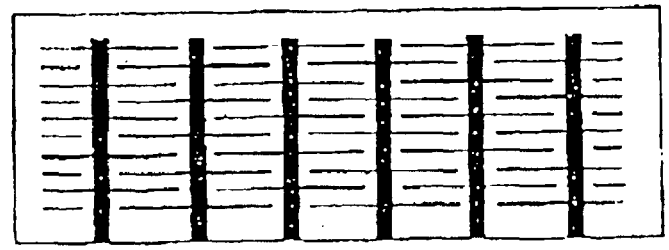

A plurality of ceramic green sheets of high dielectric constant (hereinafter, also called sheets) that contain $BaTiO_3$ powder as a main component are prepared. Next, a pattern of the first internal electrode layer is formed on half of the sheets, and a pattern of the second internal electrode layer is formed on the remaining half of the sheets. Subsequently, as shown in FIG. 3(A), these two types of sheets are laminated alternately. Next, as shown in FIG. 3(B), first and second via holes 200a and 200b are formed in a grid array using a laser. As shown in FIG. 3(C), an Ag/Pd paste is charged into the first and second via holes 200a and 200b, thereby forming the first and second via electrodes 140a and 140b. Subsequently, as shown in FIG. 3(D), a sheet, which is to become a base, is placed on the laminate of the sheets, followed by press-bonding. Electrode terminals corresponding to the via electrodes are formed on the resultant laminate, which is then fired. Notably, the method for producing the multi-layer capacitor of the first embodiment is not limited to the above-described process, but other appropriate processes may be used.

In such a multi-layer capacitor as that of the first embodiment, as is generally known, the shorter the interval between via electrodes, the more effective the mutual cancellation of magnetic fluxes induced by currents flowing through the via electrodes 140a and 140b in a direction opposite each other, whereby mutual inductance is reduced. The current path flowing through the internal electrode layers 130a and 130b is limited to a distance between the adjacent first and second via electrodes 140a and 140b. By reducing of the length of the current path, the occurrence of self-inductance can be reduced. In other words, ESL can be importantly reduced by shortening the interval between via electrodes.

According to the multi-layer capacitor of the first embodiment, because the aspect ratio of the via electrode is relatively high, the diameter of the via electrode becomes relatively small, whereby the interval between via electrodes can be shortened, and thus ESL can be advantageously reduced. Also, the diameter of apertures associated with the gaps 180 and 190 can be reduced, whereby the overlap between the first and second internal electrode layers 130a and 130b can be increased to thereby allow an increase in capacitance. Meanwhile, because the aspect ratio of the via electrode is relatively high, the length of the via electrode is relatively long, whereby the number of internal electrode layers to be laminated can be increased to thereby allow an increase in capacitance.

However, a high aspect ratio of the via electrode is not necessarily favorable. An increase in the aspect ratio compounds the difficulty of charging, in the course of forming or embedding the via electrodes, an electrically conductive paste into a hole penetrating the laminate of the dielectric layers and the internal electrodes. Specifically, as the diameter of the via electrode is reduced or as the length of the via electrode is increased, the pressure required for charging conductive electrode material into the hole increases. However, a low aspect ratio of the via electrode is not necessarily favorable. This is because as the aspect ratio is lowered, the number of layers in the capacitor decreases, thereby making it more difficult to obtain a high capacitance in a small package size.

Therefore, the aspect ratio of the via electrode is preferably more than 4, but from a view point of manufacture the satisfactory aspect ratio is 4 to 30 and most preferably 5 to 20. The diameter of the via electrode is preferably 50 $\mu$m to 120 $\mu$m, most preferably 70 $\mu$m to 100 $\mu$m.

B. Second Embodiment

A multi-layer capacitor of a second embodiment of the present invention has a structure similar to that of the multi-layer capacitor of the first embodiment, which has been described with reference to FIGS. 1 and 2, and partially differs from the multi-layer capacitor of the first embodiment in the method of producing the capacitor body 110. Therefore, the structure of the multi-layer capacitor of the second embodiment is not described, and the description below uses reference numerals similar to those appearing in the description of the first embodiment.

A method for producing the capacitor body 110 of the second embodiment will be described below. First, a plurality of ceramic green sheets (hereinafter, called sheets) that contain BaTiO$_3$ powder as a main component are prepared. Next, a pattern of the first internal electrode layer is formed on half of the sheets, and a pattern of the second internal electrode layer is formed on the remaining half of the sheets.

Next, these two types of sheets are laminated alternately. In this regard, in contrast to the first embodiment, two laminates are formed such that each laminate includes as many sheets as half the required number of layers. Next, first and second via holes 200a and 200b are formed in a grid array in each of the two laminates using a laser. Notably, the aspect ratio of the via hole of the second embodiment is half the aspect ratio of the via hole of the first embodiment. Next, an Ag/Pd paste is charged into the first and second via holes 200a and 200b of each of the laminates, thereby forming the first and second columnar via electrodes 140a and 140b. Subsequently, the two laminates are superposed. A sheet, which is to become a base, is placed on the resultant laminate, followed by press-bonding. Electrode terminals corresponding to the via electrodes are formed on the press-bonded laminate, which is then fired.

As mentioned previously, an increase in the aspect ratio of the via electrode increases the difficulty of charging an conductive material such as an Ag/Pd paste into the via holes. However, according to the method for producing the multi-layer capacitor of the second embodiment, in the stage of charging the Ag/Pd paste, via electrodes to be formed have an aspect ratio that is half the desired final aspect ratio. Therefore, even when the required aspect ratio is high, charging can be readily achieved.

Also, in the second embodiment, the aspect ratio of the via electrode is preferably 4 to 30, more preferably 4 to 25, and most preferably 5 to 20. The diameter of the via electrode is preferably 50 $\mu$m to 120 $\mu$m, more preferably 60 $\mu$m to 110 $\mu$m, most preferably 70 $\mu$m to 100 $\mu$m.

C. Third Embodiment

Figure 4:
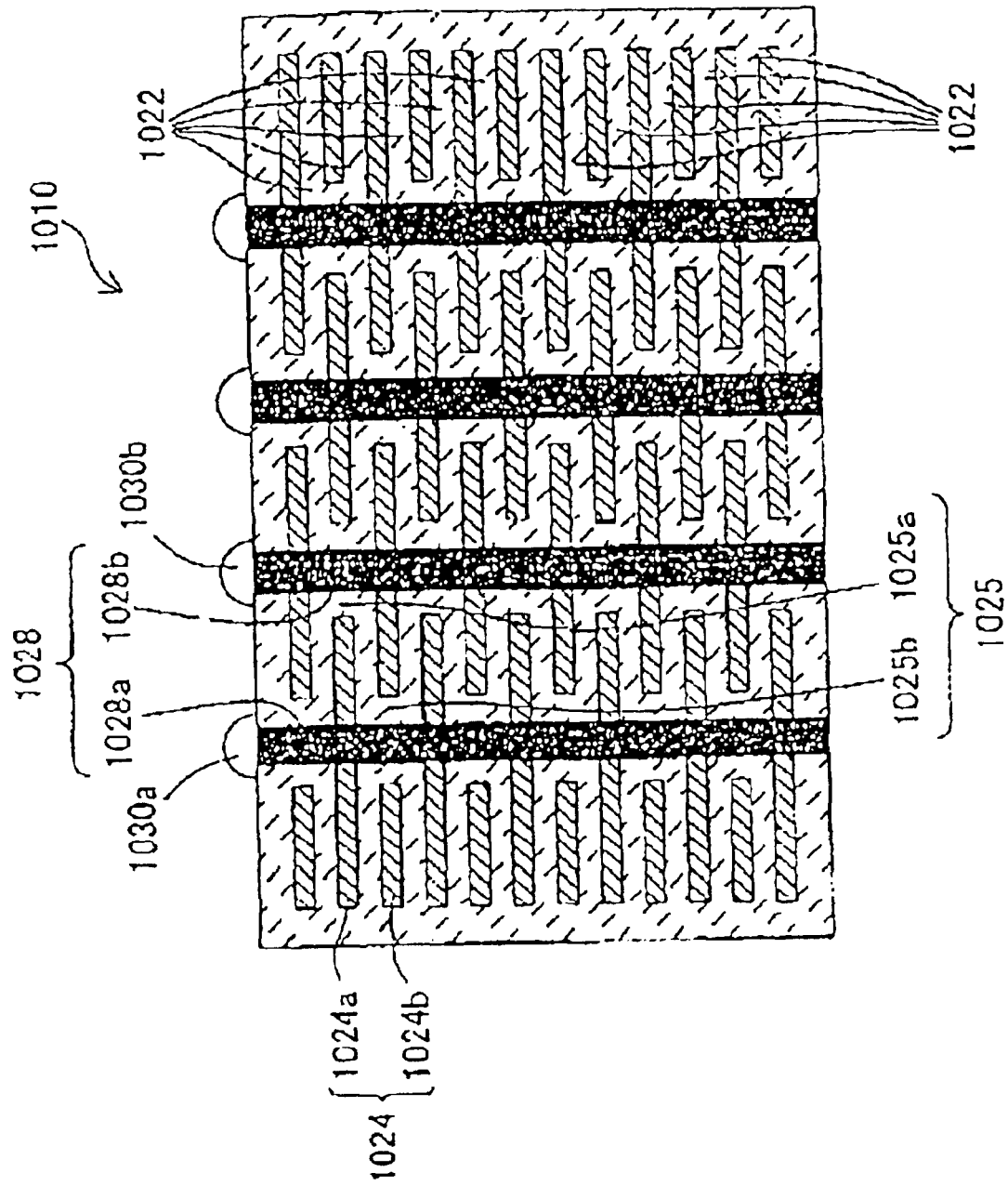
FIG. 4 is a vertical sectional view of a multi-layer ceramic capacitor 1010, which is an embodiment of the present invention.

C(1)-1 Overall configuration of multi-layer ceramic capacitor 1010:

FIG. 4 is a vertical cross-sectional view of a multi-layer ceramic capacitor 1010 according to a third embodiment of the present invention. The multi-layer ceramic capacitor 1010 is substantially similar to the multi-layer capacitor 110 shown in FIG. 1, but is slightly more detailed in FIG. 4. As described below, the multi-layer ceramic capacitor 1010 is produced by laminating ceramic green sheets. When the thus-laminated sheets are fired, the sheets are combined together through sintering. FIG. 4 shows the state after sintering of the sheets. The multi-layer ceramic capacitor 1010 includes a plurality of internal electrode layers 1024 which are formed of an electrically conductive material and are laminated by the mediation of ceramic layers 1022. Each of the internal electrode layers 1024 includes a first internal electrode layer 1024a and a second internal electrode layer 1024b, and the layer 1024a and the layer 1024b are alternately disposed. The ceramic layer 1022 provided between the internal electrode layers 1024 serves as a dielectric (insulating layer). The ceramic layer 1022 is formed of, for example, a ceramic material having a high dielectric constant, such as barium titanate (BaTiO$_3$).

Figure 5A:
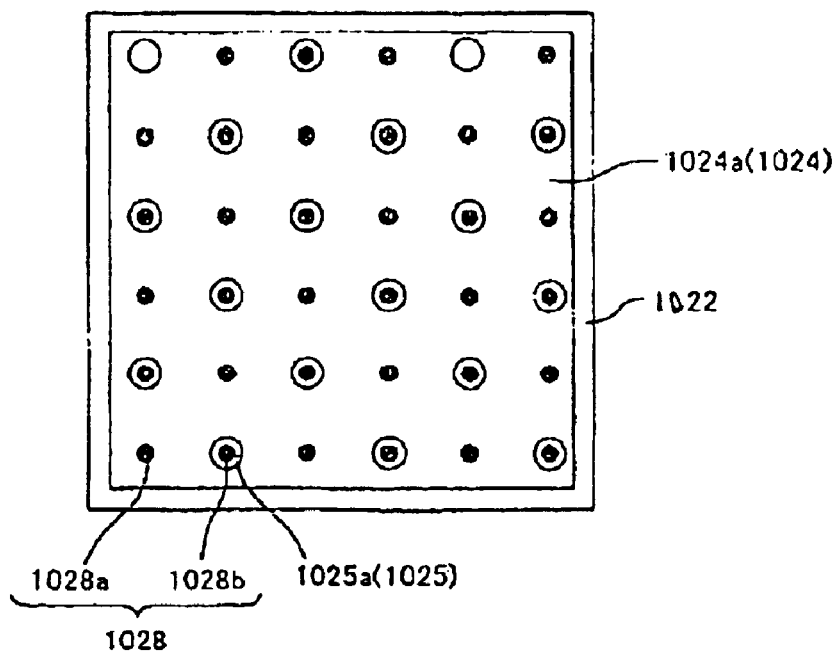
FIGS. 5(A) and 5(B) are explanatory views showing electrical connection between via electrodes 1028 and internal electrode layers 1024.
Figure 5B:
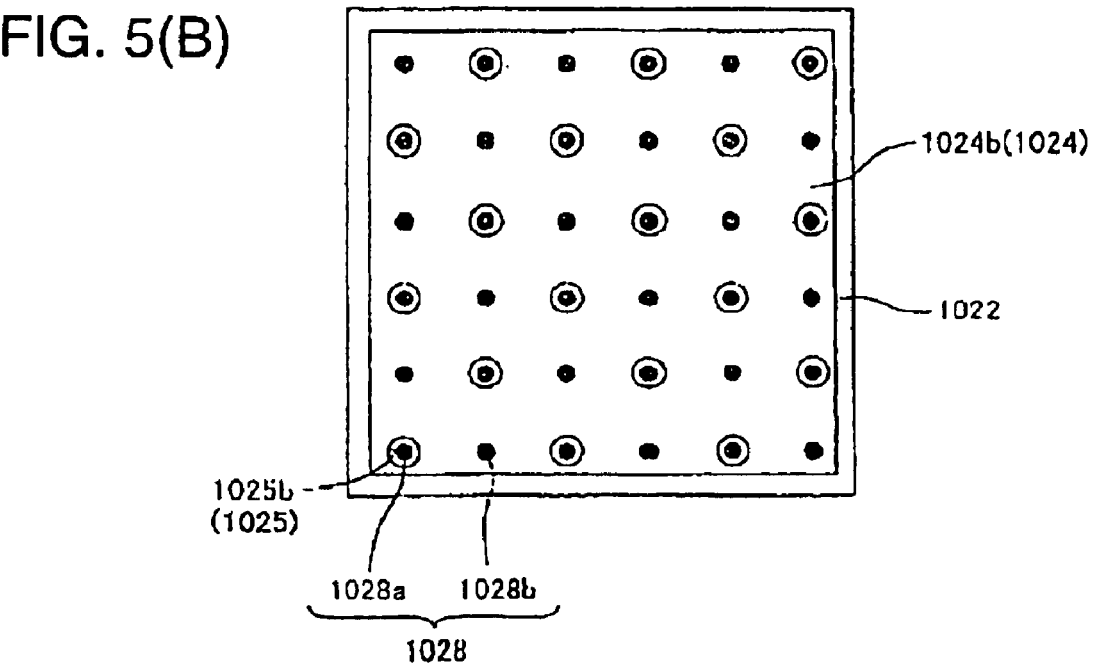

The first and second internal electrode layers 1024a and 1024b are electrically connected to via electrodes 1028a and 1028b, respectively, through which voltage is externally supplied. Each of the via electrodes 1028 includes a first via electrode 1028a and a second via electrode 1028b, which extend in the lamination direction. FIG. 5 is an explanatory view showing the connection between the via electrodes 1028 and the internal electrode layers 1024. FIG. 5(A) is a horizontal cross-sectional view of a portion of the multi-layer ceramic capacitor 1010, the portion including the first internal electrode layer 1024a; and FIG. 5(B) is a horizontal cross-sectional view of a portion of the capacitor 1010, the portion including the second internal electrode layer 1024b.

As shown in FIG. 5(A), the first internal electrode layer 1024a is electrically connected to each of the first via electrodes 1028a. This is because the electrodes 1028a penetrate the layer 1024a, and the first internal electrode layer 1024a is electrically insulated from each of the second via electrodes 1028b by means of an aperture 1025a which surrounds the electrode 1028b. Meanwhile, as shown in FIG. 5(B), the second internal electrode layer 1024b is electrically connected to each of the second via electrodes 1028b. This is because the electrodes 1028b penetrate the layer 1024b, and the second internal electrode layer 1024b is electrically insulated from each of the first via electrodes 1028a by means of an aperture 1025b which surrounds the electrode 1028a. As shown in FIG. 5, a plurality of terminal units, each including a first terminal 1030a and a second terminal 1030b, are provided on at least one of the outermost surfaces of the capacitor which extend in a direction perpendicular to the direction of lamination of the ceramic layers 1022 and the first and second internal electrode layers 1024a and 1024b.

Thus, when voltage is applied, through the first and second terminals 1030a and 1030b and the via electrodes 1028, to each of the internal electrode layers 1024, positive charges are accumulated in one of the first and second internal electrode layers 1024a and 1024b, which face each other via the ceramic layer 1022 serving as a dielectric, and negative charges are accumulated in the other electrode layer. This phenomenon occurs in each of the facing internal electrode layers, and the multi-layer ceramic capacitor 1010 functions as a capacitor. In order to obtain a higher capacitance, the multi-layer ceramic capacitor 1010 is configured such that the first internal electrode layers 1024a and the second internal electrode layers 1024b are alternately provided in the lamination direction so as to sandwich the ceramic layers 1022, thereby forming a plurality of capacitor units. Therefore, the total capacitance of the capacitor units is obtained from the capacitor 1010 as the capacitance between the first and second terminals 1030a and 1030b, including a primary capacitance between the first and second internal electrode layers (1024a and 1024b) and a secondary capacitance between the first via electrode (1028a) and the second internal electrodes (1024b) and between second via electrode (1028b) and the first internal electrode (1024a). This secondary capacitance is determined by an effective area of dielectric material surrounding the via electrodes, suggesting that if the via electrodes are corrugated more, the effective area increases contributing to an increase of the secondary capacitance.

As in the case of a conventional multi-layer ceramic capacitor, in the multi-layer ceramic capacitor 1010, the first via electrodes 1028a and the second via electrodes 1028b are alternately juxtaposed throughout each of the first internal electrode layers 1024a and the second internal electrode layers 1024b so as to form a grid-like pattern, and the direction of current flowing through each of the first via electrodes 1028a is opposite that of current flowing through each of the second via electrodes 1028b. Therefore, the capacitor 1010 attains a reduced inductance component.

Figure 6:
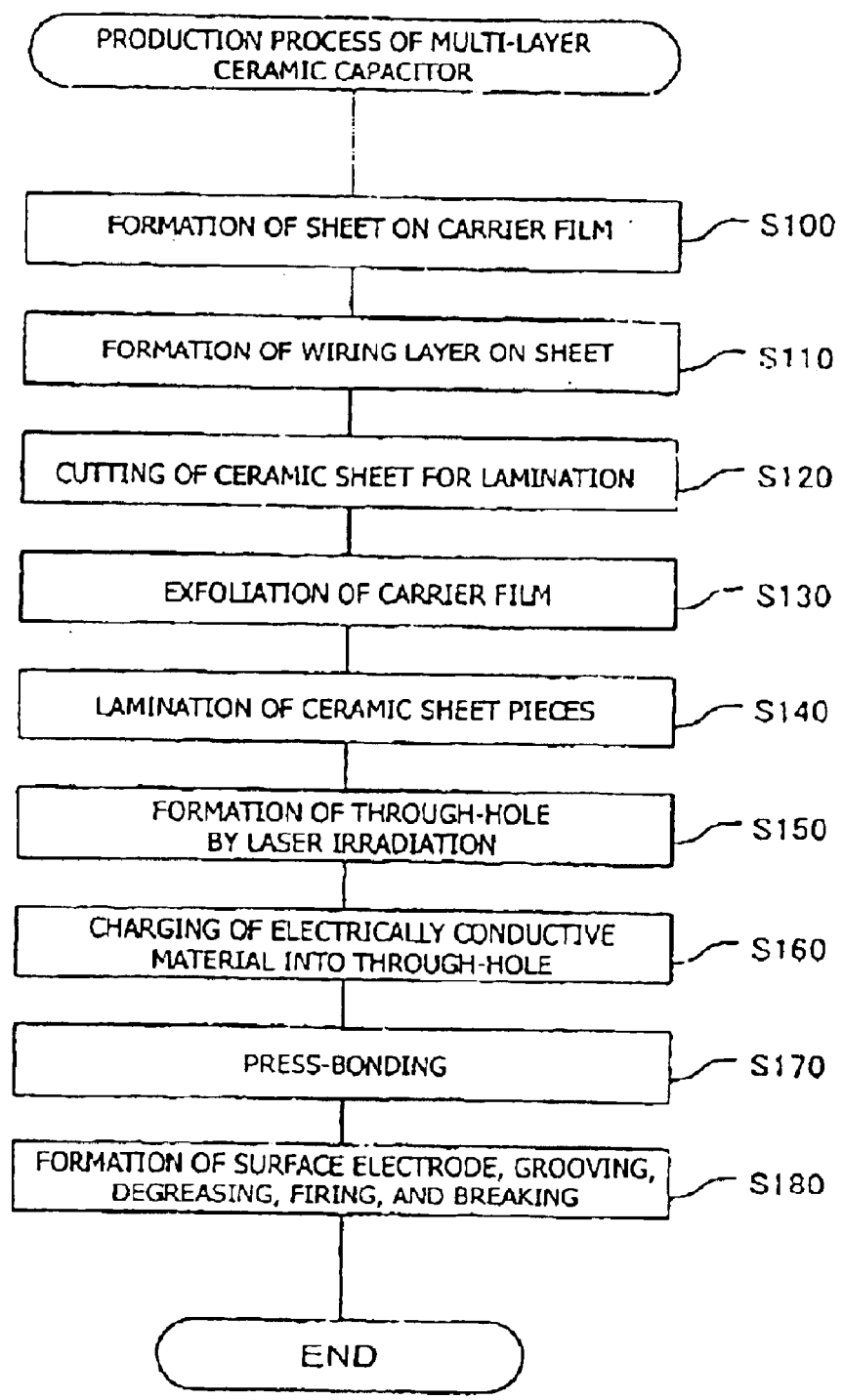
FIG. 6 is a flowchart showing the production process of the multi-layer ceramic capacitor 1010.

C(2) Production process of the multi-layer ceramic capacitor 1010:

FIG. 6 is a flowchart showing the production process of the multi-layer ceramic capacitor 1010, and FIG. 7 is an explanatory view of the production process shown in FIG. 6.

The multi-layer ceramic capacitor 1010 is produced by steps S100 to S180 shown in FIG. 6. The production process will next be described in the order of steps.

C(2)-1 Formation of sheet on carrier film (step S100):

Firstly, a ceramic slurry containing barium titanate ($BaTiO_3$) is uniformly and thinly applied to an elongated carrier film such as a PET (polyethylene terephthalate) film, and the slurry is dried. Through this procedure, a ceramic green sheet 1022A is formed on the carrier film. The ceramic green sheet 1022A is to become the ceramic layer 1022 after firing.

C(2)-2 Formation of electrode layer on sheet (step S110):

Subsequently, an Ag—Pd electrode pattern is formed on the thus-dried ceramic green sheet 1022A by means of, for example, a screen printing technique. Thus, the electrode pattern formed on the surface of the ceramic green sheet 1022A serves as the internal electrode layer 1024 (1024a and 1024b) (FIGS. 7(A) and 7(B)). Portions of the ceramic green sheet 1022A on which the electrode pattern is not formed serve as the apertures 1025 (1025a and 1025b). In the present embodiment, the thicknesses of the internal electrode layer 1024 and the ceramic green sheet 1022A are adjusted to 2 to 3 $\mu$m and 5 $\mu$m, respectively.

C(2)-3 Cutting of ceramic sheet for lamination and exfoliation of carrier film (steps S120 and S130):

Subsequently, while the elongated carrier film having the above-formed ceramic green sheet 1022A is conveyed, the ceramic green sheet 1022A having the internal electrode layer 1024 on its surface is cut into pieces of predetermined shape. The thus-cut pieces of the ceramic green sheet 1022A are exfoliated from the carrier film by means of, for example, winding of the carrier film. As shown in FIGS. 7(A) and 7(B), the ceramic green sheet 1022A is cut into two types of pieces having different layouts of the internal electrode layer 1024 and the apertures 1025. FIG. 7(A) corresponds to the cross-sectional view of FIG. 5(A), and FIG. 7(B) corresponds to the cross-sectional view of FIG. 5(B).

Figure 8:
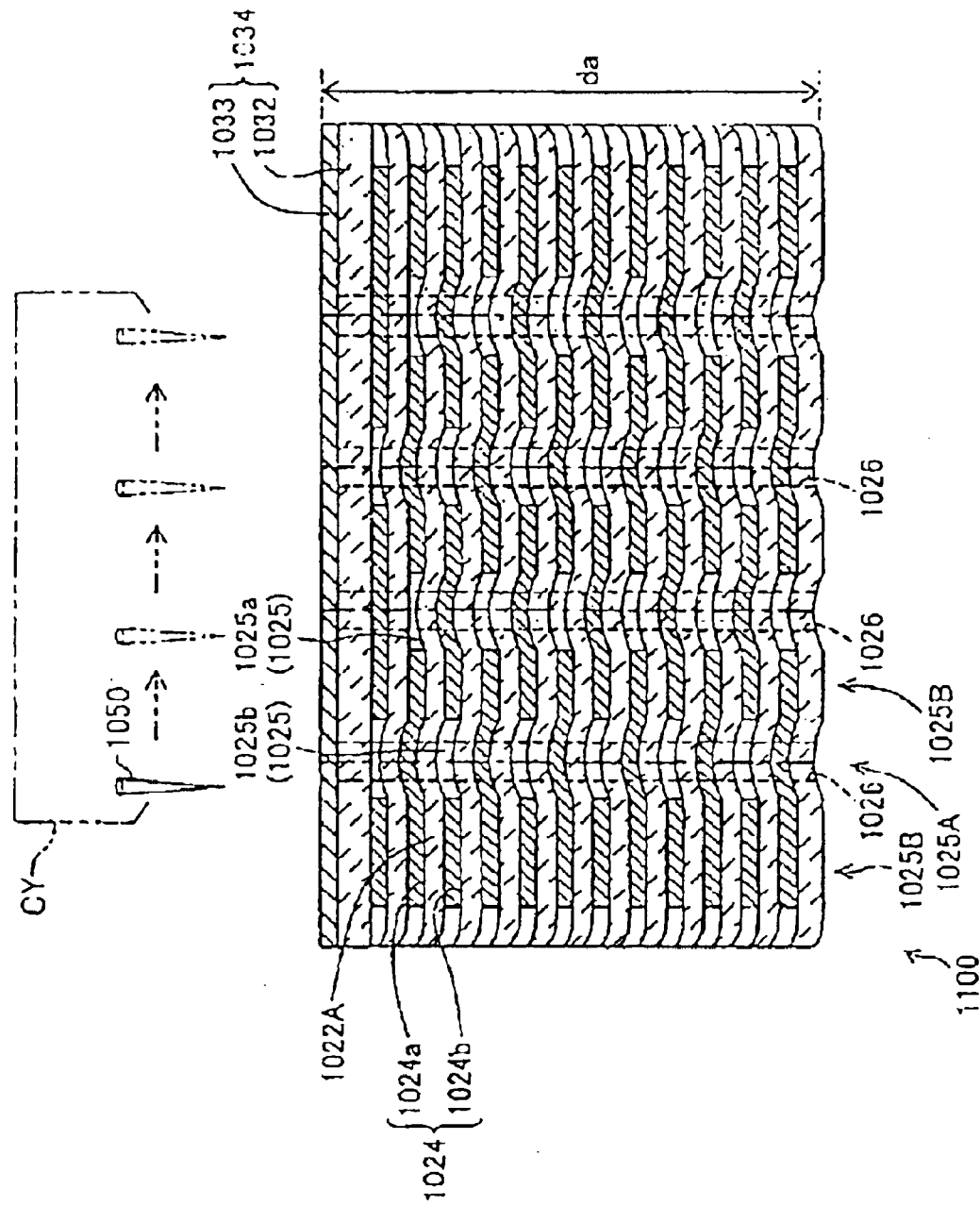
FIG. 8 is an explanatory view schematically showing the state after completion of lamination of ceramic sheets and a laser irradiation procedure.

C(2)-4 Lamination of ceramic sheet pieces (step S140):

FIG. 8 is an explanatory view schematically showing the state after completion of lamination of the ceramic sheet pieces and a laser irradiation procedure in the below-described step. Subsequently, a predetermined number of the above-formed pieces of the ceramic green sheet 1022A are laminated. During this lamination procedure, firstly, a cover sheet 1034 is provided. As shown in FIG. 8, the cover sheet 1034 includes an exfoliation sheet 1033 formed of PET (polyethylene terephthalate) and a cover layer 1032 formed on the sheet 1033, the layer 1032 being formed by thickly applying a ceramic slurry to the sheet 1033 and drying the thus-applied slurry.

Subsequently, on the cover layer 1032 of the above-provided cover sheet 1034, the two types of pieces of the ceramic green sheet 1022A shown in FIGS. 7(A) and 7(B) are alternately laminated as shown in FIG. 8. During the course of lamination of the sheet pieces, as shown in FIG. 8, the lowermost piece of the ceramic green sheet 1022A is laminated such that the internal electrode layer 1024 of the sheet piece contacts the cover layer 1032, and the subsequent piece of the ceramic green sheet 1022A is laminated such that the internal electrode layer 1024 of the sheet piece contacts the above-laminated piece of the ceramic green sheet 1022A. Through this sheet lamination procedure, a ceramic laminated sheet 1100 is produced.

The thickness (da) of the entirety of the laminated sheet 1100 including the cover sheet 1034 determines the thickness of the multi-layer ceramic capacitor 1010 (i.e., a final product). The thickness (d0) of each of the pieces of the ceramic green sheet 1022A (see FIG. 7), the total number of the laminated sheet pieces, and the thickness of the cover layer 1032, which determine the thickness (da), are adjusted in consideration of the target specification and size of the multi-layer ceramic capacitor 1010. In the present embodiment, the thickness (da) of the entirety of the ceramic laminated sheet is adjusted to 1 mm.

In the state in which lamination of the sheet pieces is completed, because the sheet pieces are green, a portion of the green sheet piece that is located above each of the apertures 1025 (1025a and 1025b) hangs downward in the aperture to some extent. At an end portion of the laminated sheet, as viewed in the cross section, each of the pieces of the ceramic green sheet 1022A bends up and down.

As shown in FIG. 8, in a region in which the apertures 1025 are vertically aligned (a region 1025A), the internal electrode layers 1024 are not provided on opposing sides of each of the laminated green sheet pieces. Meanwhile, in a region which surrounds the apertures 1025 (a region 1025B), the internal electrode layers 1024 are vertically aligned through the entirety of the laminated green sheet pieces, and thus bending of the green sheet pieces does not occur. Therefore, portions of the uppermost green sheet piece which are located within the region 1025B project slightly outwardly from portions of the uppermost green sheet piece which are located within the region 1025A.

C(2)-5 Formation of through-hole by means of laser irradiation (step S150):

Subsequently, by use of a laser machining apparatus, through-holes 1026 in which an electrically conductive material is to be charged are formed in the above-produced laminated sheet 1100 as described below. In the present embodiment, the electrically conductive material charged into the through-holes 1026 is to become the via electrodes 1028 shown in FIG. 4 after completion of the final product.

Figure 9:
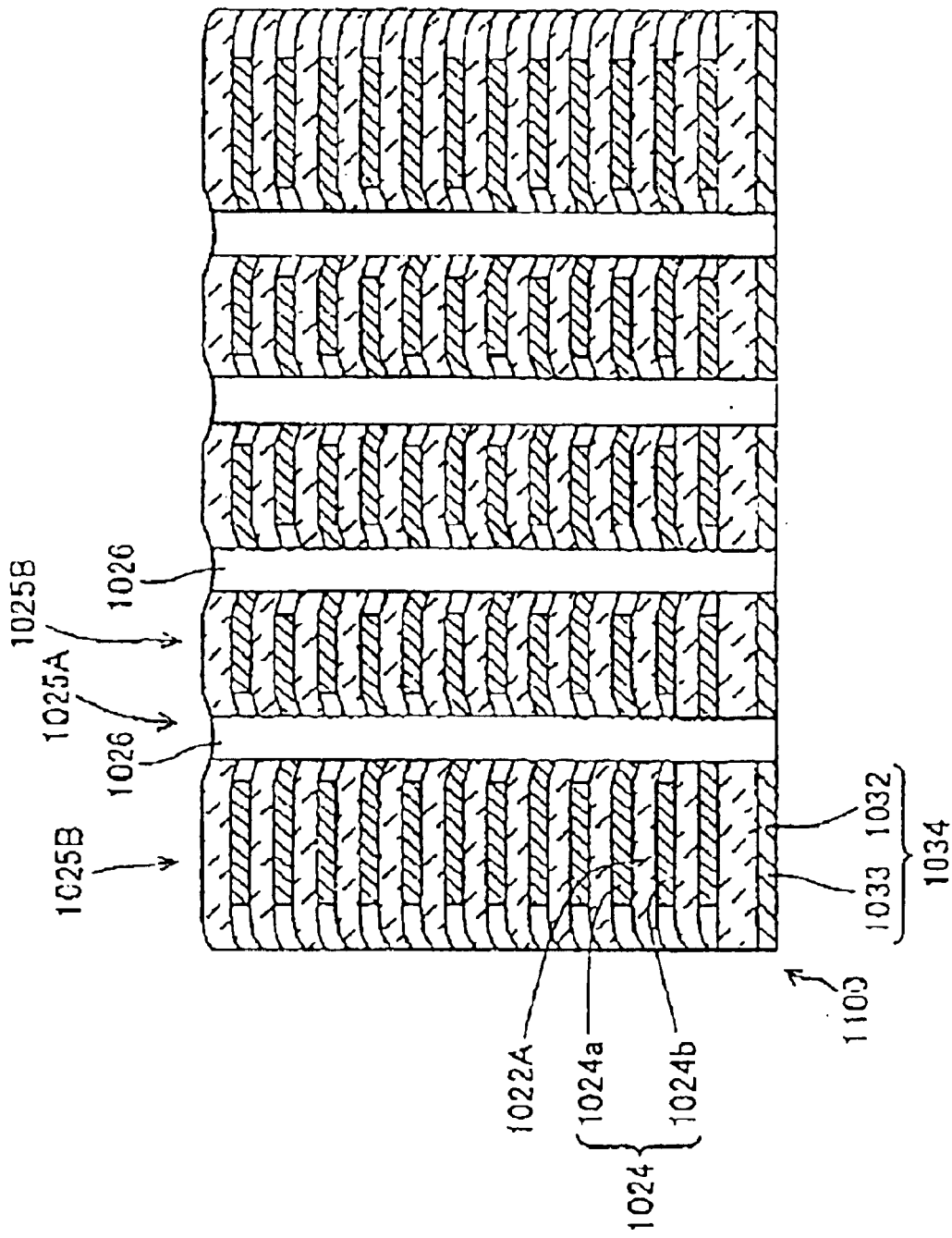
FIG. 9 is an explanatory view schematically showing a laminated sheet 1100 in which through-holes 1026 are formed.

As shown in FIG. 8, in the laminated sheet 1100, the apertures 1025 are formed in the internal electrode layers 1024a and 1024b on alternating pieces of the ceramic green sheet 1022A so as to be aligned in the lamination direction, respectively. A laser beam 1050 is radiated from the laser machining apparatus along the axis connecting the centers of the vertically aligned apertures 1025 (i.e., a dash-and-dotted line shown in FIG. 8). As a result, a portion of each of the pieces of the ceramic green sheet 1022A, a portion of each of the internal electrode layers 1024, and a portion of the cover sheet 1034, the portions being located on the axis, are melted by heat generated through laser irradiation, to thereby form, around the axis, the through-hole 1026 which vertically penetrates the laminate. FIG. 9 is an explanatory view schematically showing the state where the above-formed through-hole 1026 extends straightly. As shown in FIG. 9, the through-hole 1026 is formed such that its diameter becomes smaller than that of the apertures 1025, in order to prevent electrical contact between the internal electrode layer 1024 surrounding the aperture 1025 and the via electrode 1028 to be formed in the through-hole 1026. In the present embodiment, the diameter of the through-hole 1026 is adjusted to 120 µm such that the diameter thereof becomes 100 µm after firing, and the diameter of the aperture 1025 is adjusted to 350 µm. The diameters of the through-hole and the aperture are not limited to the above values. For example, the diameter of the through-hole 1026 may be 60 to 150 µm. The diameter of the through-hole may be determined in consideration of, for example, the viscosity of the below-described electrically conductive material (filler) to be charged into the through-hole 1026. The diameter of the aperture 1025 may be determined in consideration of, for example, the pitch between the adjacently formed apertures 1025.

Figure 10:
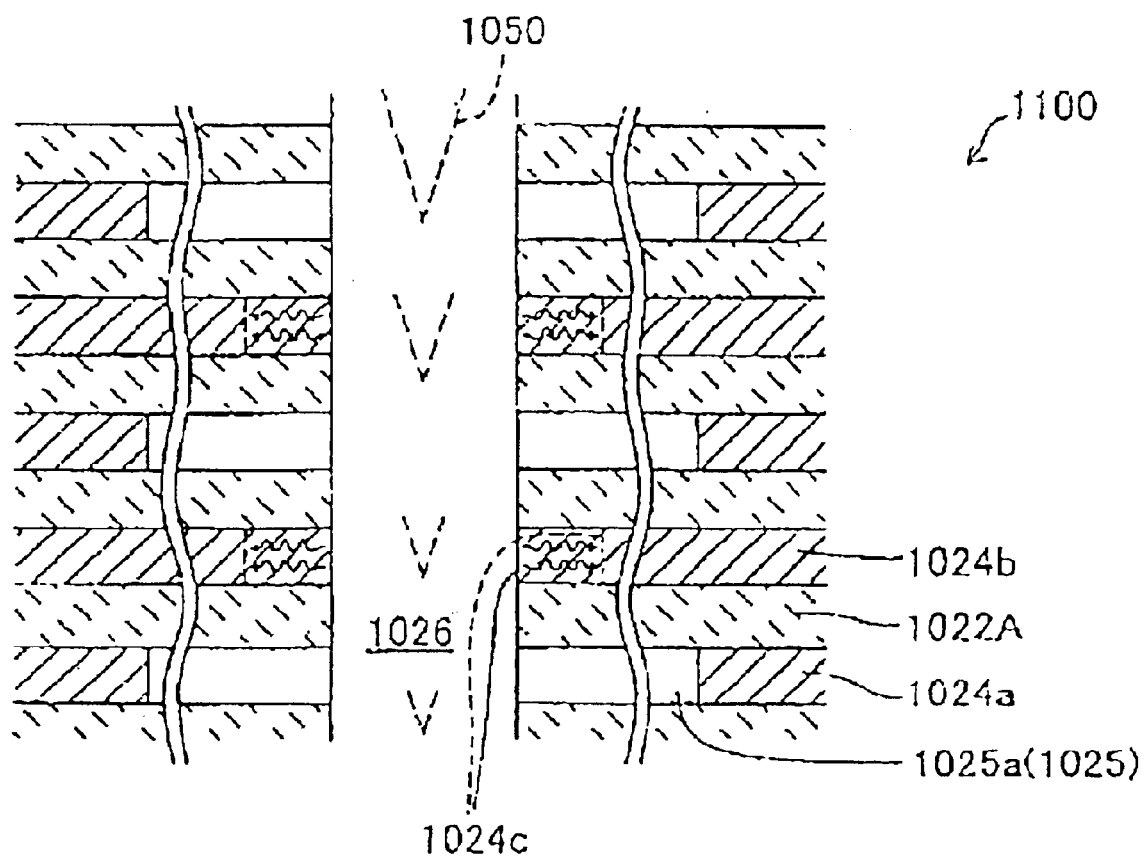
FIG. 10 is an explanatory view showing a laser irradiation procedure.

Irradiation of the laminated sheet 1100 with the laser beam forms the through-hole 1026 which penetrates the pieces of the ceramic green sheet 1022A in the lamination direction. During the course of laser beam irradiation, as shown in FIG. 10, melting of the internal electrode layer 1024, which starts from its end surface 1024c by means of heat generated through laser beam irradiation, precedes melting of the ceramic green sheet 1022A, since the internal electrode layer 1024 has a melting point lower than that of the ceramic green sheet 1022A. FIG. 10 shows the state in which the end surface 1024c retracts from the wall which defines the through-hole 1026, and the distance between the end surface 1024c of the internal electrode layer 1024 and the wall which defines the through-hole 1026 becomes at most 20 µm.

The laminated sheet 1100 shown in FIG. 8, having a rectangular shape as viewed from the top thereof, includes the apertures 1025 which are arranged so as to form a grid-like pattern. Irradiation with the laser beam 1050 is carried out at all the positions (including the positions corresponding to the four regions 1025A shown in FIG. 9) of the upper surface of the rectangular-shaped laminated sheet, each of the positions corresponding to a region in which the apertures 1025 are vertically aligned. Therefore, a large number of the through-holes 1026 are formed in the laminated sheet 1100, forming a grid-like pattern.

In the present embodiment, a "cycle machining process" is employed for forming the through-holes 1026 in different positions of the laminated sheet 1100. In the cycle machining process, as shown in FIG. 8, a step CY in which the positions at which the through-holes are to be formed are successively irradiated with the laser beam 1050 is repeatedly carried out, to thereby gradually increase the depth of the through-hole at each of the positions, and finally the through-holes are formed at all the positions. For reference, pulsed laser energy can be adjusted in the range of 300–1200 mJ/mm$^2$ with a through-hole penetrating speed of 5–100 micrometers/laser pulse. For instance, 2–20 mJ of the pulsed laser energy can be applied with duration of 3–200 microseconds in making a through hole having a diameter of 120 micrometers penetrating the green multi-layer capacitor with a one pulse laser penetration of 5–80 micrometers.

As shown in FIG. 8, in the present embodiment, laser irradiation is carried out such that the cover sheet 1034 is irradiated with the laser beam 1050. This prevents adhesion, to the surface of the ceramic green sheet 1022A, of products generated through melting of, for example, organic components contained in the electrode or the green sheet by means of irradiation with the laser beam 1050, which is preferable.

The order of the above-described steps S110 to S150 may be varied. For example, step S140 (i.e., lamination of sheet pieces) may be carried out before step S130 (i.e., exfoliation of carrier film), or step S120 (i.e., cutting of sheet) may be carried out before step S110 (i.e., formation of electrode layer). Alternatively, steps S120, S110, S140, and S130 may be carried out in this order.

Figure 11:
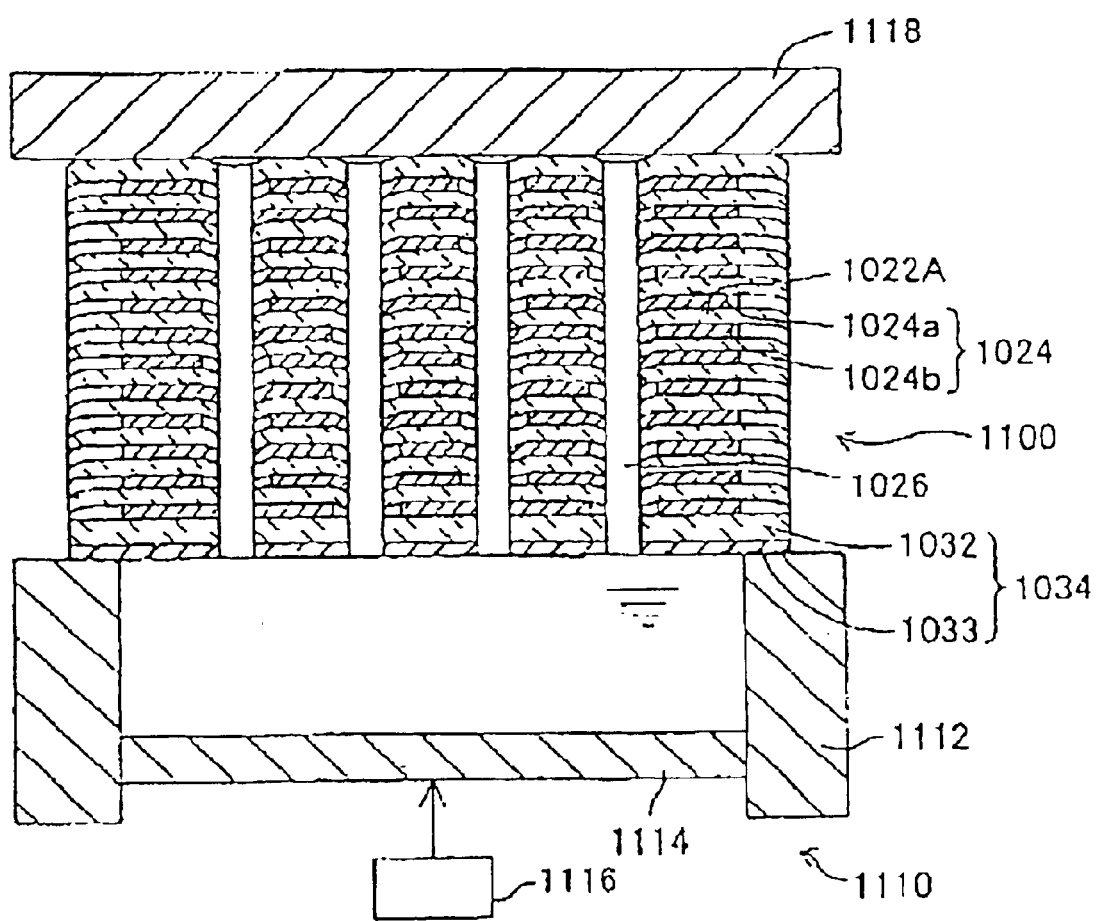
FIG. 11 is an explanatory view showing the step of charging of an electrically conductive material by use of a charging container 1110.

C(2)-6 Charging of electrically conductive material into through-holes (step S160):

Subsequently, an electrically conductive material is charged into the through-holes 1026 of the laminated sheet 1100. FIG. 11 is an explanatory view showing the step of charging of an electrically conductive material using a charging container 1110. The charging container 1110 includes a casing 1112 for accommodating an electrically conductive material, a bottom plate 1114, and an actuator 1116 for pressing the bottom plate 1114 by use of, for example, a hydraulic cylinder, thereby supplying the electrically conductive material to the laminated sheet 1100. As shown in FIG. 11, the laminated sheet 1100 is mounted on the charging container 1110. The position of the laminated sheet 1100 is determined with respect to the charging container 1110 by means of, for example, non-illustrated position-determining pins. Subsequently, a pressing plate 1118 is pressed onto the upper surface of the laminated sheet 1100 mounted on the charging container 1110. The pressing plate 1118 supports the laminated sheet 1100 so as to counter the pressure under which the bottom plate 1114 is pressed and the electrically conductive material is supplied from the charging container 1110 into the laminate 1100.

Charging of the electrically conductive material from the charging container 1110 is carried out by pressing the bottom plate 1114 by means of the actuator 1116 while the casing 1112 is filled with the electrically conductive material. Through pressing of the bottom plate 1114, the electrically conductive material is charged into the through-holes 1026 of the laminated sheet 1100 under application of pressure. During the course of charging of the electrically conductive material, air contained in the through-holes 1026 is discharged therefrom by means of an appropriate technique. For example, an air-permeable sheet may be provided on the lower surface of the pressing plate 1118 shown in FIG. 11, or the pressing plate 1118 may be formed of a porous, air-permeable plate.

Figure 12:
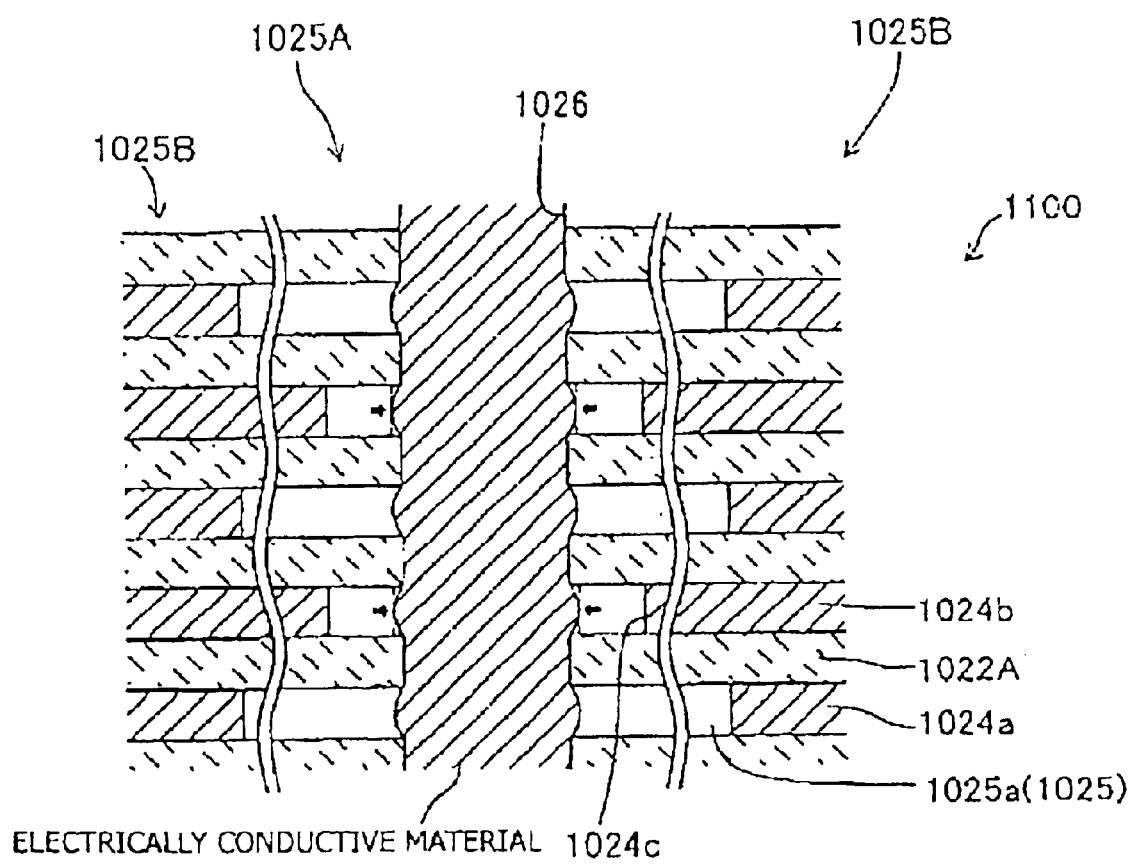
FIG. 12 is an explanatory view showing the step of charging of the electrically conductive material.
Figure 13A:
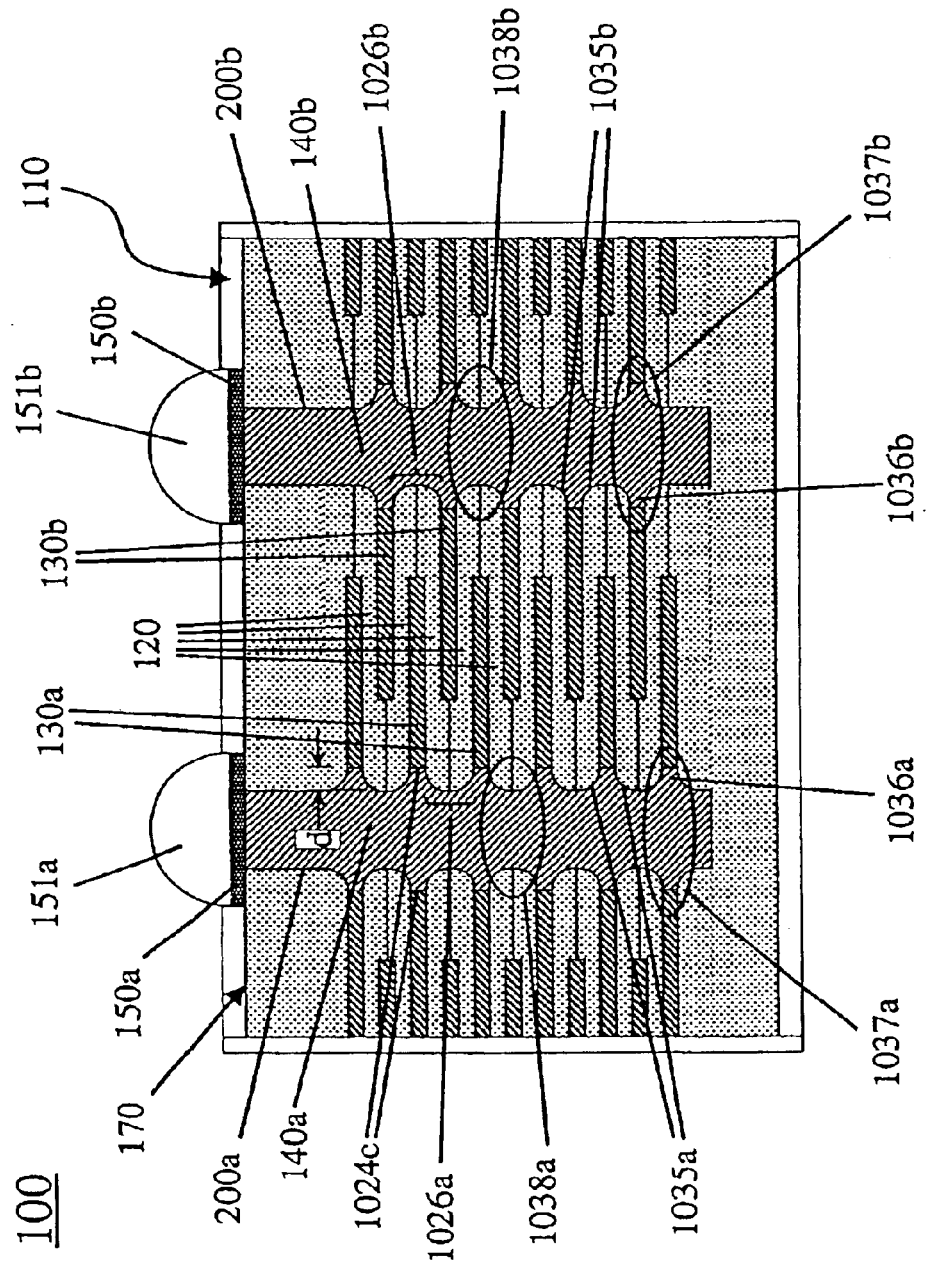
FIG. 13(A) is a vertical sectional view showing a multi-layer capacitor according an embodiment of the present invention, illustrating an internal structure thereof in detail.
Figure 13B:
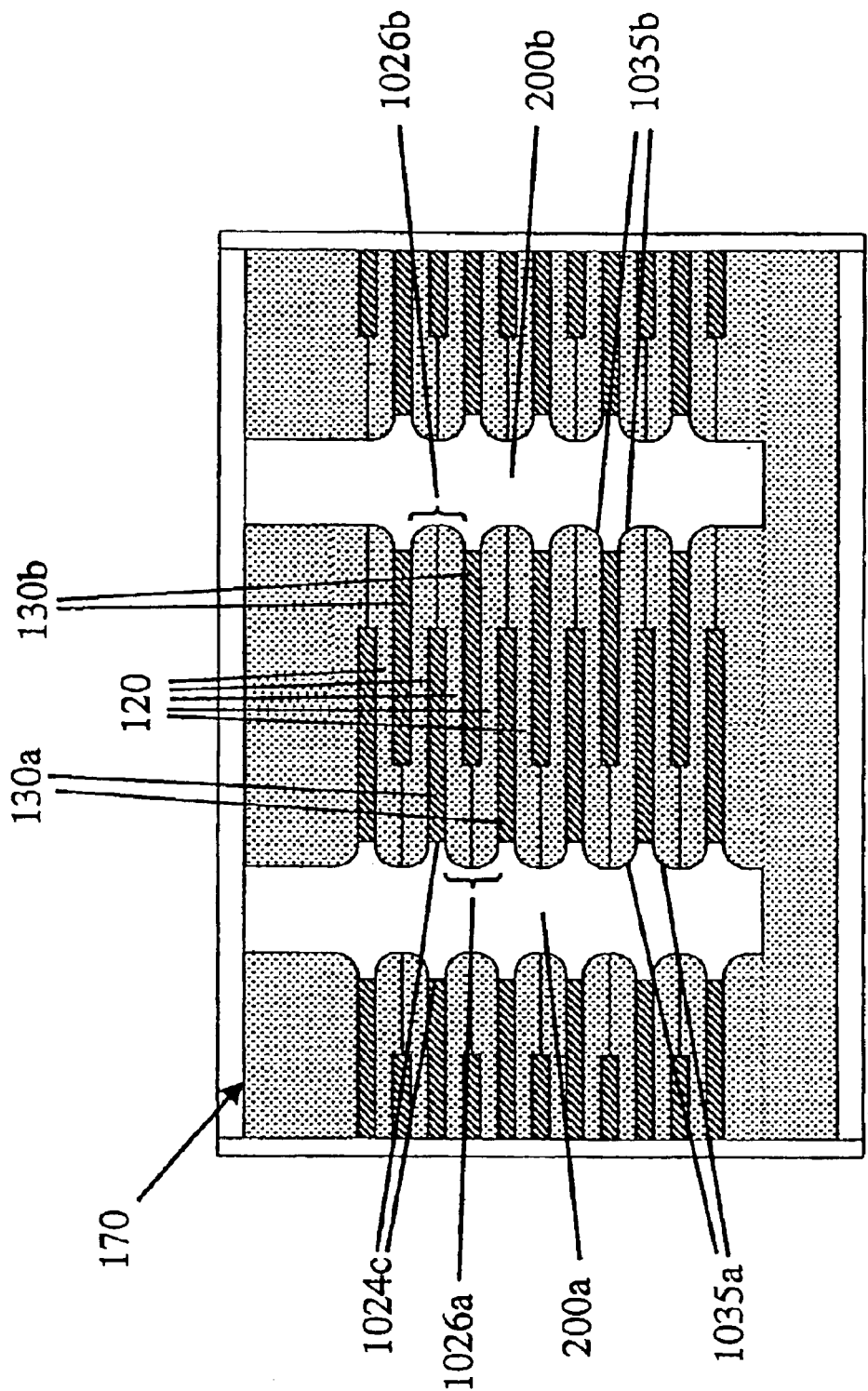
FIG. 13(B) is a vertical sectional view showing a green laminate of the multi-layer capacitor without columnar via electrodes relating to FIG. 13(A), illustrating a configuration of holes formed by a laser. Particularly.
Figure 14A:
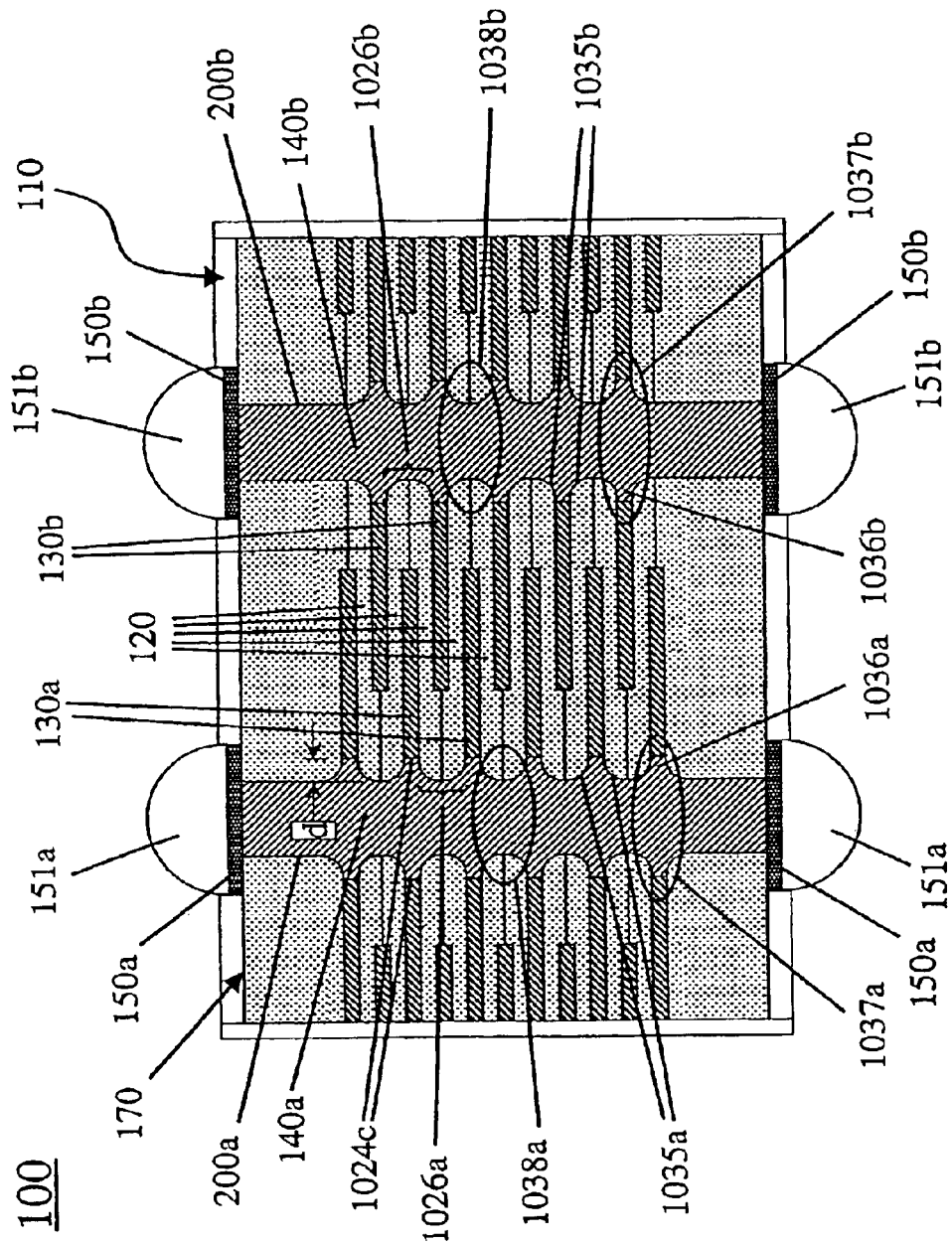
FIG. 14(A) is a vertical sectional view showing a multi-layer capacitor according to another embodiment of the invention, illustrating an internal structure thereof in detail. Particularly, in FIG. 14(A) columnar electrodes 140*a*,140*b* extend through the entire thickness direction of the laminate, and opposing sides of the columnar electrodes both end in electrode terminals 150*a*/151*a* and 150*b*/151*b*. In this manner, electrical connection to the capacitor may be made on either or both sides thereof.
Figure 14B:
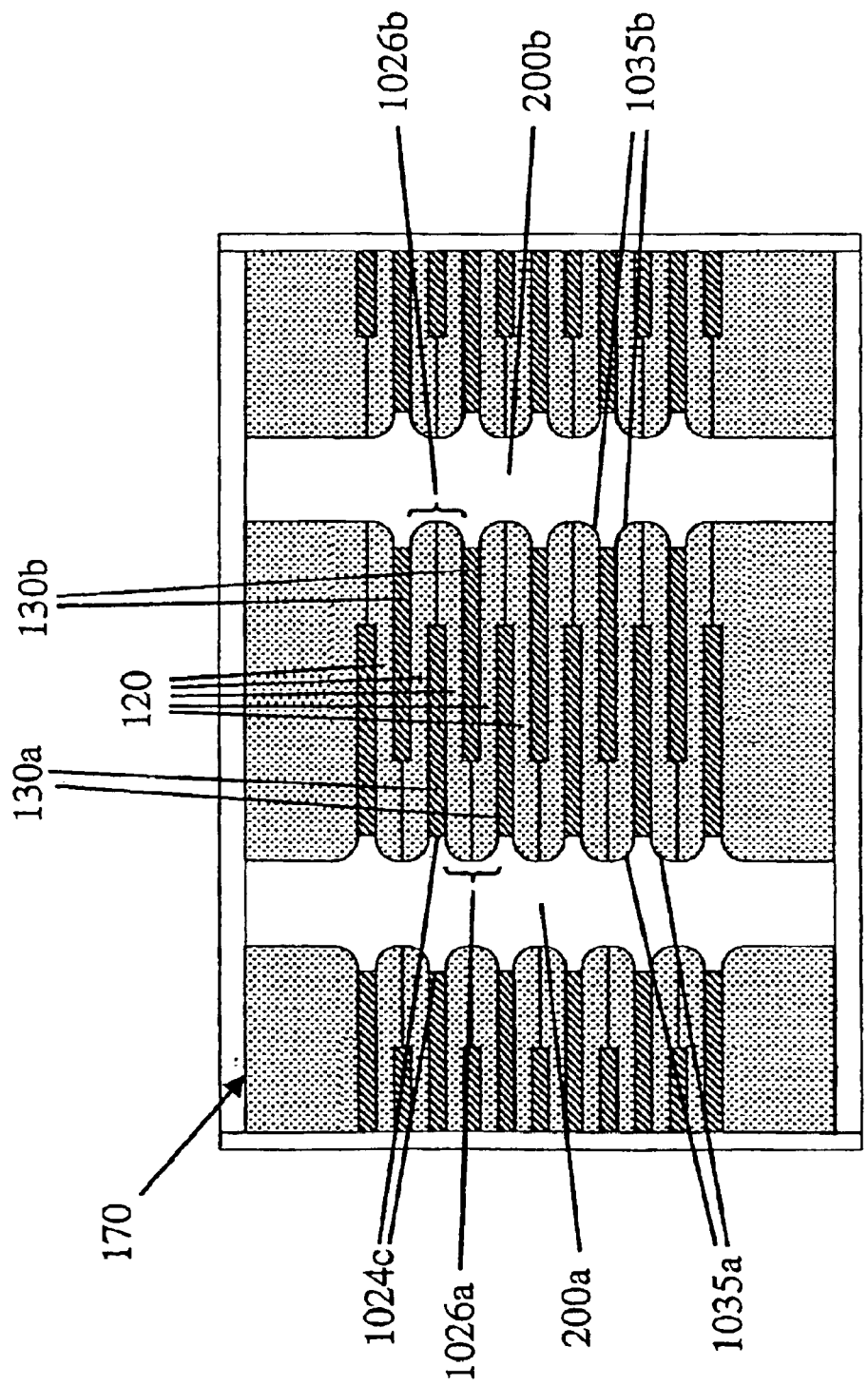
FIG. 14(B) is a vertical sectional view showing a green laminate of the multi-layer capacitor without columnar via electrodes relating to FIG. 14(A), explaining a configuration of holes formed by a laser. Particularly.

FIG. 12 is an explanatory view showing the step of charging of the electrically conductive material in the present embodiment. The electrically conductive material supplied under application of pressure is charged into each of the through-holes 1026, and the conductive material reaches, via the through-hole 1026, the end surfaces 1024c of the internal electrode layers 1024 and solidifies. The thus-solidified electrically conductive material functions as the aforementioned via electrode 1028 (see FIG. 4).

In the charging step, in order to charge the electrically conductive material into each of the through-holes 1026 and to cause the conductive material to reach the end surfaces 1024c of the internal electrode layers 1024, parameters (e.g., characteristics of the electrically conductive material, the diameter of the through-hole 1026, and pressure under which the material is supplied) are appropriately determined. Specifically, as the electrically conductive material, an electrically conductive paste containing an organic solvent and metallic powder having an average particle size of 2 $\mu$m or less is employed. The metallic powder may be, for example, Ag—Pd powder (the ratio of Ag to Pd may be, for example, 7:3). When the average particle size of the metallic powder exceeds 2 $\mu$m, the size of each of the particles becomes larger than the size (about 2 $\mu$m as measured in the lamination direction) of a recess extending from the end surface 1024c of each of the internal electrode layers 1024 toward the through-hole 1026, and thus the electrically conductive material encounters difficulty in reaching the end surface 1024c. An electrically conductive paste containing metallic powder having an average particle size of 3.6 $\mu$m and an electrically conductive paste containing metallic powder having an average particle size of 0.6 $\mu$m were compared with each other for evaluation of electrical connection. As a result, the paste containing metallic powder having an average particle size of 3.6 $\mu$m was found to exhibit poor electrical connection.

The organic solvent may be, for example, butyl carbitol or terpineol. If desired, the electrically conductive paste may contain an inorganic compound powder such as $BaTiO_3$, $SrTiO_3$, $TiO_2$, $SiO_2$, $Al_2O_3$ and/or MgO in an amount of 1–40% by volume. Inorganic compound powder prevents problems, including occurrence of cracking caused by stress generated by the difference in shrinkage upon sintering between the ceramic green sheets 1022A and the internal electrode layers 1024. The thus-prepared electrically conductive paste has a viscosity of 100 to 20,000 Pa.s, preferably 200 to 2,000 Pa.s.

The pressure under which the electrically conductive material (paste) is supplied from the charging container 1110 varies in accordance with, for example, the diameter of each of the through-holes 1026 or the viscosity of the electrically conductive paste. When the diameter of the through-hole 1026 is 120 $\mu$m (100 $\mu$m after firing), the pressure is determined so as to fall within a range of 2 to 7.5 MPa. When the pressure is equal to or higher than 2 MPa, which is the lower limit, the electrically conductive material can be reliably charged into the through-hole 1026. When the pressure is equal to or lower than 7.5 MPa, which is the upper limit, even if the viscosity of the electrically conductive material is high, the material can be reliably charged into the through-hole 1026.

Also, in the third embodiment, the aspect ratio of the via electrode is preferably 4 to 30, more preferably 4 to 25, and most preferably 5 to 20. The diameter of the via electrode is preferably 50 $\mu$m to 120 $\mu$m, more preferably 60 $\mu$m to 110 $\mu$m, most preferably 70 $\mu$m to 100 $\mu$m.

As mentioned previously, a reduction in the diameter of the via electrode and an increase in the aspect ratio combinedly enhance the difficulty of charging the Ag/Pd paste into the via holes. However, according to the method for producing the multi-layer capacitor of the third embodiment, the electrically conductive paste is charged under pressure into the via holes, whereby, even in the case of a small diameter of the via electrode and a high aspect ratio, charging can be readily carried out. Therefore, the method is suited for producing a multi-layer capacitor having via electrodes of a diameter of 60 $\mu$m to 110 $\mu$m (preferably 60 $\mu$m to 100 $\mu$m) and a high aspect ratio of 5 to 20 (preferably, 8 to 20, more preferably 10 to 20).

In contrast to a method for charging an electrically conductive paste by means of printing, the third embodiment allows for use of an electrically conductive paste of higher viscosity. Thus, in the drying step subsequent to injection, the exposed surface of the via electrode does not sink. Also, because of injection into via holes under pressure, even an electrically conductive paste of a higher viscosity can be readily injected into via holes having a high aspect ratio.

C(2)-7 Press-bonding step (step S170):

Subsequently, the above-obtained charging container 1110 is subjected to press-bonding by use of a high-temperature, high-pressure press. Through this press-bonding of the laminated sheet 1100, the vertically laminated ceramic layers 1022 come into close contact with one another.

C(2)-8 Formation of surface electrode, grooving, degreasing, firing, and breaking (step S180):

Subsequently, a surface electrode is formed on the outer surface of the laminated sheet 1100 by means of, for example, screen printing. Subsequently, grooves are formed in the laminated sheet 1100 in accordance with the size of the multi-layer ceramic capacitor 1010 to be used in practice, and the thus-grooved laminate is subjected to degreasing, followed by firing. Through this firing, the multi-layer ceramic capacitor 1010 shown in FIG. 4 is produced. When the above-fired laminated sheet 1100 is subjected to breaking along the grooves (not illustrated) formed in the grooving procedure, a multi-layer ceramic capacitor 1010 of smaller size can be produced.

C(3) Operation and effects of the embodiment:

Next, the operation and effects obtained from the embodiment will be described, in which the above-described production steps are performed.

As shown in FIG. 10, in the step of forming the through-holes 1026, the positions at which the through-holes are to be formed are repeatedly irradiated with the laser beam 1050 as described above, and accordingly, the depth of the thus-formed holes increases. During the hole formation step, melting of the internal electrode layer 1024, which starts from its end surface 1024c by means of heat generated through laser beam irradiation, precedes melting of the ceramic green sheet 1022A, since the internal electrode layer 1024 formed of the Ag—Pd electrode pattern has a melting point lower than that of the ceramic green sheet 1022A. Thus, the end surface 1024c retracts from the wall which defines the through-hole 1026, and the distance between the end surface 1024c of the internal electrode layer 1024 and the wall which defines the through-hole 1026 becomes at most 20 μm. However, in the present embodiment, the electrically conductive material enters a recess formed between the wall which defines the through-hole 1026 and the end surface 1024c of the internal electrode layer 1024, and thus reliable electrical conduction can be established between the via electrode 1028 and the internal electrode layer 1024. This is because in the step of charging of the electrically conductive material, the viscosity of the electrically conductive material, the average particle size of metallic powder, and the pressure under which the conductive material is charged are appropriately determined.

EXAMPLES

Several multi-layer capacitor products 1010 were produced by use of the following four electrically conductive materials of different viscosities: an electrically conductive material having a viscosity of 1,000 Pa.s (sample 1), an electrically conductive material having a viscosity of 10,000 Pa.s (sample 2), an electrically conductive material having a viscosity of 50,000 Pa.s (sample 3), and an electrically conductive material having a viscosity of 150,000 Pa.s (sample 4), which were prepared in step S160 (i.e., the step of charging of electrically conductive material). Each of the thus-produced capacitor products was observed under a microscope for evaluation of electrical connection between the via electrode 1028 and the internal electrode layer 1024. As a result, in the case of sample 1 having a viscosity as low as 1,000 Pa.s, sufficient electrical connection between the electrode 1028 and the layer 1024 was confirmed. In contrast, in the case where electrically conductive materials having a high viscosity (i.e., sample 2 having a viscosity of 10,000 Pa.s, sample 3 having a viscosity of 50,000 Pa.s, and sample 4 having a viscosity of 150,000 Pa.s) were employed, poor electrical connection between the electrode 1028 and the layer 1024 was confirmed. Meanwhile, even in the case of sample 4 having a viscosity of 150,000 Pa.s, the resistance of the resultant capacitor product was not so high as that of the capacitor product produced by use of sample 1. However, the inductance of the capacitor product produced by use of sample 4 was found to be higher by 100 to 500% than that of the capacitor product produced by use of sample 1. The results suggest that insufficient electrical connection between the via electrode 1028 and the internal electrode layer 1024 greatly affects the inductance of the capacitor, rather than the resistance thereof.

MODIFICATION EXAMPLES

The present invention is not limited to the above-described embodiments, and various modifications may be performed without departing from the scope of the present invention. For example, the following modifications are possible.

Modification Example 1

The above embodiments use a ceramic material having a high dielectric constant that contains $BaTiO_3$ as a main component, to form the dielectric layer. However, another material may be used to form the dielectric layer. Examples of such material include $PbTiO_3$, $PbZrO_3$, $TiO_2$, $SrTiO_3$, $CaTiO_3$, $MgTiO_3$, $KNbO_3$, $NaTiO_3$, $KTaO_3$, $RbTaO_3$, $(Na_{1/2}Bi_{1/2})TiO_3$, $Pb(Mg_{1/2}W_{1/2})O_3$, and $(K_{1/2}Bi_{1/2})TiO_3$. The material may be selected from the above according to, for example, the required capacitance of the capacitor.

Modification Example 2

The above embodiments use Ag/Pd to form the internal electrode layers and via electrodes. However, any other appropriate material may be used. Examples of such material include Pt, Ag, Ag—Pt, Pd, Cu, Au, and Ni.

Modification: Example 3

The number of internal electrode layers and that of via electrodes are not limited to those of the above embodiments. The numbers may be modified as appropriate.

Modification Example 4

According to the method for producing the capacitor body of the second embodiment, in the course of forming the capacitor body, via electrodes are formed in two laminates, which are then combined to form the capacitor body. However, three or more laminates may be combined to form the capacitor body.

This application is based on Japanese Patent Application, Nos. 2003-287822 filed Aug. 6, 2003 and 2002-294351 filed Oct. 8, 2002, the disclosures of which are incorporated herein by reference in their entirety.

What is claimed is:

1. A multi-layer ceramic capacitor comprising, a plurality of dielectric ceramic layers, each having first and second layer planes;

a plurality of first internal electrodes provided on the first layer planes of the dielectric ceramic layers and a plurality of the second internal electrodes provided on the second layer planes of the dielectric ceramic layers, the dielectric layers being sandwiched by the first and second internal electrodes; and a plurality of first and second columnar electrodes penetrating the dielectric ceramic layers in a direction normal to the layer planes of the ceramic layers, the first columnar electrodes being electrically connected to the first internal electrodes and the second columnar electrodes being electrically connected to the second internal electrodes, wherein the first and second columnar electrodes each has a corrugation including smaller diameter portions and larger diameter portions, wherein the first internal electrodes are electrically connected to the first columnar electrodes at larger diameter portions of the first columnar electrodes and the second internal electrodes are electrically connected to the second columnar electrodes at larger diameter portions of the second columnar electrodes, and wherein circumferential edges of the dielectric ceramic layers intrude into the first and second columnar electrodes at the smaller diameter portions of the first and second columnar electrodes, respectively.

2. The multi-layer ceramic capacitor as claimed in claim 1, wherein a plurality of first and second holes penetrating said dielectric ceramic layers are formed by laser, and said first and second columnar electrodes are embedded respectively in the first and second holes.

3. The multi-layer ceramic capacitor as claimed in claim 1, wherein said circumferential edges are rounded or tapered by laser.

4. The multi-layer ceramic capacitor as claimed in claim 1, wherein a difference in diameter between the larger diameter portions and the smaller diameter portions is more than a thickness of the dielectric ceramic layer, the thickness being defined as the distance between the first and second internal electrodes sandwiching the dielectric layer.

5. The multi-layer ceramic capacitor as claimed in claim 1, wherein said columnar electrodes have an aspect ratio of more than 4, the aspect ratio defined as a value of the length of a given columnar electrode divided by the smallest diameter of the smaller diameter portions of the columnar electrode.

6. The multi-layer ceramic capacitor as claimed in claim 1, wherein said columnar electrodes have an aspect ratio of 4–30, the aspect ratio defined as a value of the length of a given columnar electrode divided by the smallest diameter of the smaller diameter portions of the columnar electrode.

7. The multi-layer ceramic capacitor as claimed in claim 1, wherein an average difference between the diameter of the larger diameter portions and the diameter of the smaller diameter portions in said columnar electrodes is about 10–40 micrometers.

8. The multi-layer ceramic capacitor as claimed in claim 1, wherein said columnar electrodes comprise a composite including two metallic grains differing in grain size, an average grain size of one powder being less than 1/3 of that of the other powder and constituting about 25–70 percent by volume of the material of the columnar electrodes.

9. The multi-layer ceramic capacitor as claimed in claim 1, wherein said dielectric ceramic layers, first and second inner electrodes and first and second columnar electrodes are co-fired to obtain the multi-layer ceramic capacitor.

10. The multi-layer ceramic capacitor as claimed in claim 1, wherein the diameter of the first and second columnar electrodes is about 50–120 micrometers as measured at the smallest diameter thereof.

11. The multi-layer ceramic capacitor as claimed in claim 1, further comprising a plurality of first and second external terminals connected respectively to the first and second columnar electrodes and formed on one external surface of the multi-layer ceramic capacitor but not formed on the other external surface of the multi-layer ceramic capacitor.

12. The multi-layer ceramic capacitor as claimed in claim 1, wherein the larger diameter portions of the first and second columnar electrodes are flange-like connecting portions tapering toward the internal electrodes.

13. The multi-layer capacitor as claimed in claim 12, wherein the via electrodes have a diameter of 50 $\mu$m to 120 $\mu$m.

14. A multi-layer capacitor comprising a capacitor body comprising a co-fired laminate of dielectric layers and first and second internal electrode layers which are alternately laminated by mediation of the dielectric layers, the capacitor body further comprising first and second electrode terminals formed on one main surface of the capacitor body, at least a single first via electrode extending through the capacitor body in the lamination direction of the capacitor body so as to connect the first electrode terminal and the first internal electrode layers, and at least a single second via electrode extending through the capacitor body in the lamination direction of the capacitor body so as to connect the second electrode terminal and the second internal electrode layers, the via electrodes having an aspect ratio of 4 to 30.

* * * * *